United States Patent Office 3,455,944
Patented July 15, 1969

3,455,944
CERTAIN CYCLOALKYL-HETEROCYCLIC
AMINES
Michael Mullen Robison, Watchung, N.J., assignor to Ciba Corporation, New York, N.Y., a corporation of Delaware
No Drawing. Continuation-in-part of application Ser. No. 491,044, Sept. 28, 1965, which is a continuation-in-part of application Ser. No. 406,576, Oct. 26, 1964. This application May 11, 1966, Ser. No. 549,180
Int. Cl. C07d 31/42, 5/04, 27/04
U.S. Cl. 260—295
13 Claims

ABSTRACT OF THE DISCLOSURE

Cycloaliphatic amines with 5 to 8 ring-carbon atoms, e.g. those of the formula

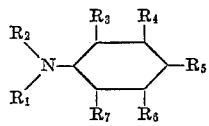

$R_{1,2}$=H or hydrocarbon radicals also interrupted by N, O, S
$R_{3,7}$=H or alkyl
$R_{4,6}$=H, cycloalkyl or $R_5$
$R_5$=carbo- or heterocyclic aryl hydroxy, acyloxy or dehydro derivatives, N-oxides, quateraries and salts thereof, exhibit diuretic effects.

---

This is a continuation-in-part of application Ser. No. 491,044 filed Sept. 28, 1965, now abandoned, which in turn is a continuation-in-part of application Ser. No. 406,576 filed Oct. 26, 1964, now abandoned.

The present invention concerns and has for its object the provision of new cycloaliphatic amines with 5 to 8 ring-carbon atoms in the cycloaliphatic moiety, which latter contains a single amino group on one ring-carbon atom and on separate ring-carbon atoms at least one heterocyclic aromatic radical or at least one carbocyclic aromatic and two carbocyclic aliphatic or aromatic radicals, but not more than three radicals selected from the group consisting of a heterocyclic aromatic, a carbocyclic aliphatic and a carbocyclic aromatic radical, whereby in the triaryl compounds at least two of the aromatic radicals are separated from the amino-nitrogen atom by at least three ring-carbon atoms, N-oxides and quaternaries thereof and salts of these compounds, as well as methods for their preparation.

These compounds may contain one or two double bonds in the cycloaliphatic moiety, separated from the amino group by at least 2 single bonds and may be unsubstituted or substituted in the remaining positions thereof available for substitution, for example by lower alkyl or aralkyl, such as methyl, ethyl, n- or i-propyl or butyl; benzyl, 1- or 2-phenylethyl, free, etherified or esterified hydroxy, such as lower alkoxy, lower alkanoyloxy, aroyloxy, lower alkane or benzene sulfonyloxy, e.g. methoxy, ethoxy, n- or i-propoxy or n-butoxy; acetoxy, propionyloxy, butyryloxy, pivalyloxy, benzoyloxy, methane, ethane, benzene or p-toluene sulfonyloxy, halogen, e.g. chloro or bromo, acyl, such as lower alkanoyl or aroyl, e.g. acetyl, propionyl, butyryl or benzoyl, free, esterified or amidated carboxy, such as carbo-lower alkoxy, e.g. carbomethoxy or carbethoxy, carbamyl, lower alkyl- or di-lower alkylcarbamyl, e.g. methyl- or ethyl-carbamyl, dimethyl- or diethylcarbamyl, or cyano.

The maino-substituent therein is an unsubstituted or substituted amino group. The substituents of the amino group are above all lower hydrocarbon radicals that may also be interrupted by hetero atoms, for example, nitrogen, oxygen or sulfur atoms. As lower hydrocarbon radicals, there may be mentioned above all lower alkyl or alkenyl groups, for example, methyl, ethyl, n- or i-propyl, straight or branched chain butyl, pentyl, hexyl or heptyl groups bound in any position; allyl or methallyl groups; cycloalkyl or cycloalkenyl radicals, such as cyclopentyl, cyclohexyl, cycloheptyl, cyclopentenyl or cyclohexenyl groups; lower aralkyl or aralkenyl radicals, such as benzyl, phenethyl, styryl or 1-phenyl-buten(1)-yl-(3), lower alkylene or alkenylene groups such as ethylene, 1,3-propylene, 1,4-butylene, 1,5-pentylene, 1,5,2,5- or 1,6-hexylene or 2,6-heptylene 1,4-but(2)enylene 1,4- or 1,5-pent(2)enylene, 1,5-hex(2)enylene, 1,6-hex(3) enylene or 2,6- hept(3)-enylene. Hydrocarbon radicals that are interrupted by hetero atoms are, for example, di-lower alkylamino-lower alkyl or lower alkoxy-lower alkyl radicals, such as 1-dimethyl- or 1-diethylamino-ethyl-(2), -propyl-(3) or butyl-(4) groups, 1-methoxy- or 1-ethoxy-ethyl-(2) or -propyl-(3) groups, aza-, oxa- or thia-alkylene radicals, such as 3-aza, 3-oxa or 3-thia-pentylene-(1,5), 3-methyl- or 3-ethyl-3-aza-pentylene-(1,5), 3-aza-hexylene-(1,6) or 4-aza- or 4-oxa-heptylene-(2,6).

Said amino group is primarily a tertiary amino group, for example a di-lower alkylamino group, such as dimethylamino, diethylamino, N-methyl-ethylamino or dipropylamino, and especially a lower alkylene-, aza-alkylene, oxa-alkylene- or thia-alkyleneimino group, such as pyrrolidino, piperidino, piperazino, N-methylpiperazino, morpholino or thiamorpholino.

The heterocyclic aromatic radical is a mono- or bicyclic radical containing at most two nitrogen atoms or an oxygen or sulfur atom, such as 2- or 3-pyrryl, 2-, 3- or 4-pyridyl, 2- or 3-indolyl, 2-, 3-, 4- or 8-quinolyl, 1- or 3-isoquinolyl, 2-imidazolyl, 3- or 4-pyridazinyl, 2-, 4- or 5-pyrimidinyl, 2-pyrazinyl, 4-oxazolyl, 2-thiazolyl, 4H-1,2-oxazinyl-(4), 2H-1,3-oxazinyl-(2), 4H-1,3-thiazinyl-(4), 2-quinazolinyl, 2-quinoxalinyl, 1-phthalazinyl, 1,5-naphthyridinyl-(2) or -(4), 2,6- or 2,7-naphthyridinyl-(1), 2-furyl, 3-thiophenyl, 2H-pyranyl- or thiopyranyl-(2), 4H-pyranyl- or thiopyranyl-(4), 2H-chromenyl-(2), 4H-thiochromenyl-(4) or 1H-pyrano[3,4-c]pyridyl-(8).

The carbocyclic aromatic radical preferably is also a mono- or bicyclic one, such as phenyl, 1- or 2-naphthyl, whereas the carbocyclic aliphatic radical preferably is a monocyclic one, containing especially 5 to 7 ring-carbon atoms, such as the cycloalkyl or cycloalkenyl radicals mentioned above.

All of the aromatic radicals mentioned may be unsubstituted or substituted in the nucleus by one or more than one of the same or of different substituents, for example lower alkyl groups, such as those mentioned above, free or functionally converted hydroxy or mercapto groups, such as methoxy, ethoxy, methylenedioxy, methyl- or ethylmercapto, halogen, e.g. fluoro- chloro or bromo, trifluoromethyl, amino, especially di-lower alkylamino, e.g. dimethyl- or diethylamino, or free or functionally converted carboxy of sulfonyl, e.g. carbethoxy or sulfamyl.

The quaternaries are preferably those containing an additional lower alkyl or aralkyl group, e.g. one of these mentioned above, on any tertiary nitrogen atom present.

The compounds of the invention possess valuable pharmacological properties. Thus, they exhibit some anti-inflammatory and especially diuretic activity, with negligible effect on potassium excretion, which can be demonstrated in animal tests using, for example, rats and dogs as test objects. This is in contrast to the kaliuresis which may accompany the natri- and chloriuresis of known non-mercurial diuretics. The compounds of the present invention are, therefore, useful diuretic, especially natri- and chloriuretic agents, for example in the treatment of excessive water, sodium and chlorine retention due, for example, to heart failure or kidney conditions. Furthermore, the new compounds are useful as intermediates in the manufacture of other valuable compounds, especially medicines.

Particularly useful are compounds of the general formula

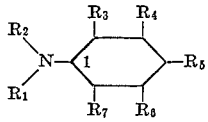

in which $R_1$ stands for hydrogen or lower alkyl, $R_2$ for hydrogen, lower alkyl, di-lower alkylamino- or lower alkyleneimino-lower alkyl or $R_1$ and $R_2$ taken together stand for lower alkylene or lower azo-, oxa- or thia-alkylene, each of $R_3$ and $R_7$ stands for hydrogen or lower alkyl, each of $R_4$ and $R_6$ stands for cycloalkyl or one of the radicals mentioned for $R_5$ and $R_5$ stands for monocyclic carbocyclic or heterocyclic aryl, which latter contains at most two nitrogen atoms or an oxygen or sulfur atom and which aryl radicals are unsubstituted or substituted by lower alkyl, lower alkoxy, halogen, trifluoromethyl or di-lower alkylamino, their 3-hydroxy or -acyloxy derivatives of which the acyl radical is that of a lower fatty acid or a monocyclic, carbocyclic aryl sulfonic acid, or the dehydro derivatives thereof in which the double bond extends from the 3-position, the lower alkyl quaternaries and acid addition salts of these compounds.

Compounds that are especially valuable are those of the above formula in which each of $R_1$ and $R_2$ stands for alkyl with up to 4 carbon atoms or $R_1$ and $R_2$ taken together stand for 1,4-butylene, 1,5-pentylene, 3-oxa- or 3-thia-pentylene-(1,5) or 3-methyl- or 3-ethyl-3-aza-pentylene-(1,5), each of $R_3$ and $R_7$ stands for hydrogen or methyl, each of $R_4$ and $R_6$ stands for phenyl, lower alkyl-phenyl, lower alkoxy-phenyl, halophenyl, trifluoromethyl-phenyl or di-lower alkylamino-phenyl and $R_5$ stands for pyridyl or lower alkyl-pyridyl.

Above all the present invention concerns compounds of the formula

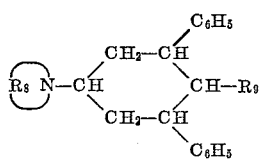

in which $R_8$ stands for 1,4-butylene, 1,5-pentylene, 3-oxa- or 3-thia-pentylene-(1,5) or 3-methyl- or 3-ethyl-3-aza-pentylene-(1,5) and $R_9$ stands for pyridyl-(2), pyridyl-(3) or pyridyl-(4) and acid addition salts thereof, which, when given to dogs at a dosage range between about 0.1 and 10 mg./kg./day, preferably at about 5 mg./kg./day, show outstanding diuretic activity, whereas their lower alkyl pyridinium quaternaries show outstanding hypotensive activity in dogs at about the same dosage range.

The new compounds are prepared by methods in themselves known. Thus, for example, by
(a) reducing the condensation product by an aryl-cycloaliphatic ketone with ammonia or an amine containing at least one hydrogen atom at the nitrogen atom, or
(b) reacting a cycloaliphatic aminoketone with an aromatic metal compound and hydrolysing the resulting metal adduct or
(c) replacing in an aryl-cycloaliphatic compound a substituent R in the cyloaliphatic ring, which is capable of being converted into amino, by an amino group, and, if desired, introducing into the resulting compounds any substituent disclosed or converting any substituent present by another disclosed substituent.

The condensation product of an aryl-cycloaliphatic ketone especially with an amine is, for example, an enamine, a Schiff base or an oxime. It is reduced, advantageously, without being isolated, for example, with catalytically activated hydrogen, i.e. hydrogen in the presence of a suitable catalyst, such as palladium platinum, platinum oxide or Raney nickel, with a complex di-light metal hydride, such as sodium boro-hydride, or with formic acid or also nascent hydrogen.

An aromatic metal compound is, for example, an alkali metal or Grignard compound, e.g. phenyl or 2-pyridyl lithium or a phenyl, naphthyl or quinolyl magnesium halide.

The substituent R capable of being converted into amino is, for example, a reactive esterified hydroxyl group, more especially a hydroxyl group esterified with a strong inorganic or organic acid, for example, a halogen atom, such as chlorine or bromine, or an aryl-sulfonyloxy group, such as p-toluenesulfonyloxy. It is converted into an amino group, for example, by reaction with ammonia or a primary or secondary amine or with agents yielding them, such as hexamethylene tetramine, Schiff bases or phthalimide salts. In the latter case, the condensation products obtained are, if necessary, split in the usual manner, for example, by hydrolysis or hydrazinolysis.

In the products obtained, substituents that may be present may be split off or further substituents may be introduced by known methods. For example, a compound that contains on one ring-carbon atom besides the aryl radical a free or esterified hydroxyl group, this group can be eliminated with formation of a double bond. Elimination of a free hydroxyl group may be performed, for example, with strong acids, such as sulfuric or phosphoric acid, and elimination of an esterified hydroxyl group, for example, with bases, such as an alkali metal carbonate or pyridine. The dehydro compounds thus obtained may be hydrogenated, for example, with catalytically activated hydrogen. Also aryl groups present can be hydrogenated to the corresponding cycloalkyl groups. Furthermore any functional converted hydroxy or carboxy group present may be hydrolyzed or solvolyzed or in any amine obtained a substituent may be introduced into the amino group, if necessary, after conversion into a metal, e.g. alkali metal, derivative thereof. This can be done, for example, by reaction with a reactive ester of an appropriate alcohol, for example, that with a hydrohalic, e.g. hydrochloric, hydrobromic or hydriodic acid, or a sulfonic acid, such as a lower alkane or benzene sulfonic acid, e.g. methane, ethane or p-toluene sulfonic acid, whereby higher substituted amines or quaternaries are obtained, or by reductive alkylation, i.e. reaction with an appropriate oxo compound and subsequent reduction analogous to the method shown under (a), or by oxidation, for example with hydrogen peroxide, a percarboxylic or sulfonic acid, e.g. peracetic, perbenzoic, monoperphthalic or p-toluene persulfonic acid, in order to obtain the N-oxides. In compounds, amino-substituted by radicals which can be eliminated by hydrogenolysis, for example, amino-substituted by α-arylalkyl e.g. benzyl radicals, the said radicals can be split off in the usual manner by hydrogenolysis.

These reactions are carried out according to standard methods, in the presence or absence of diluents, preferably such as are inert to the reagents and are solvents thereof, of catalysts, condensing or neutralizing agents and/or inert atmospheres, at low temperatures, room temperature or advantageously elevated temperatures, at atmospheric or superatmospheric pressure.

The products of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with organic or inorganic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, p-aminobenzoic, anthranilic, p-hydroxybenzoic, salicylic, p-aminosalicylic, embonic, methanesulfonic, ethanesulfonic, hydroxyethanesulfonic, ethylenesulfonic, halobenzenesulfonic, toluenesulfonic, naphthalenesulfonic or sulfanilic acid, methionine, tryptophane, lysine or arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

Furthermore, the compounds of the invention are obtained in the form of various geometrical isomers (epimers) or, if they contain an asymmetrical carbon atom, in the form of racemate mixtures, pure racemates or optical antipodes. Epimers or mixtures of racemates obtained may be separated by virtue of the physicochemical differences between the components, for example by crystallization and/or chromatography. Racemic starting materials or end products can likewise be resolved into the optical antipodes by known methods, for example, by reaction with optically active acids, separation of the diastereomeric salts and liberation of the bases from the salts.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly those starting materials should be used in the reactions of the invention that lead to the formation of those compounds indicated above as being especially valuable.

The starting materials are known or, if they are new, may be prepared by methods in themselves known. Thus, for example, the 3,4,5-triaryl-cyclohexanone compounds may be prepared by condensation of a 1,2-diaryl-ethanone with a $\Delta^1$-1-aryl-2-alkanoyl-alkene, advantageously in the presence of an alkali metal alcoholate, such as sodium ethylate. The 3-hydroxy-3,4,5-triaryl-cyclohexanone so obtained, may be dehydrated, for example, by the use of a strong acid, and hereupon catalytically hydrogenated to the 3,4,5-triaryl-cyclohexanone. This can be reduced, for example, with a complex di-light metal hydride, such as lithium aluminum hydride or sodium borohydride to form the corresponding 1-hydroxy-compound of which the hydroxyl group easily can be converted into the substituent R, capable of being converted into amino, for example, by treatment with a halogenating agent, such as thionyl chloride or bromide, phosphorus tribromide, phosphorus oxychloride or triphenoxy-phosphorus dichloride, or with an aromatic sulfonylchloride, such as tosylchloride or brosylchloride.

Another method for the preparation of said starting material consists in the aldol condensation of a bis-acyl-lower alkane, in which the carbonyl groups are separated by at least 2 carbon atoms and which may contain an etherified hydroxy group, e.g. 1,3-dibenzoyl-propane or 1,3-dibenzoyl-2-benzyloxy - propane, with a mono - aryl-methane, e.g. toluene or a picoline, and dihydration of the resulting cycloalkanediol to the corresponding cycloalkadiene. In case it does not contain said etherified hydroxy group, it is oxidized, e.g. with chromium trioxide in pyridine, to the unsaturated ketone, which may be hydrogenated to the corresponding saturated ketone. In case the above dehydration product does contain said etherified hydroxy group, it may be easily hydrolyzed or hydrogenolyzed, e.g. by catatylical hydrogenation, yielding the saturated cyclic alcohol.

Furthermore, said starting ketones can be obtained directly by Michael-condensation of conjugated $\beta,\beta'$-diaryl-alkadienones, e.g. di-benzylidene-acetone, with a mono-aryl-methane, or by Diels-Alder-condensation, for example, of 1,2-diaryl-ethenes with 1-aryl-1,3-butadienes, epoxydation of the resulting 3,4,5-triaryl-cyclohexene, for example, with hydrogen peroxide, reductive cleavage of the epoxide obtained and, if desired, oxydation of the resulting cyclohexanol to the corresponding ketone.

Mono-, di- and triaryl-cycloalkanones may also be prepared by subjecting an aryl-alkane-dicarboxylic acid ester, e.g. $\gamma$-pyridyl-pimelic acid or $\beta,\beta'$-diphenyl-$\gamma$-pyridyl-pimelic acid dimethyl ester, to Dieckmann condensation and decarboxylating the resulting cyclic ketoacid, for example, by pyrolysis. The same compounds are obtained by subjecting an araliphatic diketone, e.g. 3-phenyl- or pyridyl-2,4-pentadione or $\alpha$-phenyl or pyridyl-$\alpha$-benzoyl-acetophenone, to acetoacetic ester synthesis followed by ketone splitting, decarboxylation and, if desired, hydrogenation of the condensation product.

The corresponding cyclopentanone starting material can be prepared according to the Wallach degradation, by bromination of the cyclohexanone compounds, alkalitreatment of the dibromide, decarboxylation and oxidation of the resulting 1-hydroxy-cyclopentane-carboxylic acid.

The corresponding cycloheptanone may be obtained from the cyclohexanone compounds by ring expansion with diazomethane, whereas the corresponding cyclooctanol can be obtained by reaction of the enamine condensation products with ethyl propiolate, hydrolysis, reduction and decarboxylation of the resulting 2-carbethoxycyclooctanone.

Prior to the reduction step mentioned under (a) substituents, such as alkyl, aralkyl, acyl or cyano groups, may be introduced into any enamine condensation product, for example, by reaction with the corresponding halo compounds. The same can be done with the cycloaliphatic ketones, which also may undergo aldol condensations for the introduction of substituents followed by dehydration and, if desired, hydrogenation and oxidation.

The compounds of the invention can be used in the free form or in the form of their salts, for example, for the manufacture of pharmaceutical preparations containing the said compounds in admixture with organic or inorganic, solid or liquid pharmaceutical excipients suitable especially for enteral, but also for parenteral administration. Suitable excipients are substances that do not react with the new compounds, for example water, gelatine, lactose, starch, stearyl alcohol, magnesium stearate, talc, vegetable oils, benzyl alcohols, gums, porpylene glycols, white petroleum jelly and other known medicinal excipients. The pharmaceutical preparations may be, for example, tables, dragees or capsules, or in liquid form as solutions, suspensions or emulsions. They may be terilized and/or contain adjuvants such as preserving, stabilizing, wetting or emulsifying agents, solutions promoters, salts for regulating the osmotic pressure or buffers. They may further contain other therapeutically valuable substances, such as those described in copending application Ser. No. 522,345 filed Jan. 24, 1966, for example, other diuretics, such as 6-chloro-7-sulfamyl-3,4-dihydro-2H-1,2,4-benzothiadiazine-1,1-dioxide.

The following examples illustrate the invention, temperatures are given in centigrade and all parts given are parts by weight.

EXAMPLE 1

To 100 ml. of benzene, 1.52 g. of pyrrolidine and 3.50 g. of 3,5-diphenyl-4-(2'-pyridyl)-cyclohexanone are added and the solution is refluxed under nitrogen for 6 hours, during which time water is removed by means of a water trap. The benzene is removed in vacuo and, to the resulting amorphous enamine, 125 ml. of absolute ethanol and 1 g. of 10% palladium-charcoal are added. The enamine is hydrogenated at atmospheric temperature and pressure and hereupon the catalyst is separated, the solvent evaporated and the residue triturated with ether to produce a crystalline product. Recrystallization from n-hexane yields the 1-pyrrolidino-3,5-diphenyl-4-(2'-pyridyl)-cyclohexane of the formula

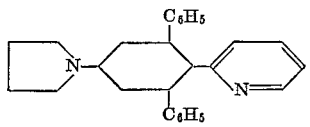

melting at 107–109°.

The starting material can be prepared as follows: A sodium ethoxide solution is prepared by dissolving 9.6 g. of sodium in 900 ml. of absolute ethanol under nitrogen. 81 g. of 2-phenacyl-pyridine are added with stirring, followed, after dissolution, by the addition of 60 g. of benzalacetone. The vigorously-stirred mixture begins to deposit crystals of the condensation product almost at once. The mixture is stirred 30 minutes with mild external cooling, then the product is separated by filtration, washed with water and dried. Recrystallizations from benzene yield the pure 3-hydroxy-3,5-diphenyl - 4 - (2' - pyridyl)-cyclohexanone, M.P. 247–250°. Crystallization of material from the mother liquor and recrystallization from benzene yields the by-product 1,3-diphenyl-2-(2'-pyridyl)-hexane -1,5-dione, M.P. 168–170°.

A mixture of 30 ml. of 85% phosphoric acid and 10.0 g. of 3-hydroxy-3,5-diphenyl-4-(2'-pyridyl)-cyclohexanone is heated on the steam bath with stirring under nitrogen for 1 hour. After cooling, the mixture is poured into water and made alkaline with ammonia. The product is extracted into methylene chloride and the extract dried and evaporated. Heating the residue with cyclohexane causes crystallization of a mixture of the threo and erythro isomers of 3,5-diphenyl-4-(2'-pyridyl)-cyclohexen-2-one, which after recrystallizations from cyclohexane melt at about 122–125°.

11.9 g. of crude (mixed stereoisomers) 3,5-diphenyl-4-(2'-pyridyl)-cyclohexen-2-one in 200 ml. of ethyl acetate is shaken with 4 g. of 10% palladium-charcoal under hydrogen at about 50 p.s.i. pressure for two days. Filtration of the catalyst and evaporation of the solvent to a low volume results in crystallization of the pure 3,5-diphenyl-4-(2'-pyridyl)-cyclohexanone melting at 240°.

EXAMPLE 2

Using equivalent amounts of 3-hydroxy-3,5-diphenyl-4-(2'-pyridyl)-cyclohexanone instead of 3,5-diphenyl-4-(2'-pyridyl)-cyclohexanone, and following the condensation with pyrrolidine and hydrogenation of the enamine as shown in Example 1, there is obtained the 1-pyrrolidino-3,5-diphenyl-3-hydroxy-4-(2'-pyridyl)-cyclohexane of the formula

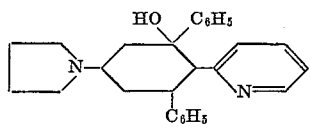

melting, after recrystallizations from cyclohexane, at 163–164°.

EXAMPLE 3

A suspension of 3.43 g. of 3-hydroxy-3,5-diphenyl-4-(2'-pyridyl)-cyclohexanone, 0.5 g. of platinum oxide and 0.88 g. of β-dimethylaminoethylamine in 250 ml. of absolute ethanol is hydrogenated at atmospheric temperature and pressure. The catalyst is separated and the solution evaporated to a gum. The residue is dissolved in diethyl ether and the solution washed with water, dried and evaporated. The residue is dissolved in 10 ml. of acetone and there is added a solution of 2.2 g. of maleic acid in acetone. The resulting crystalline salt is recrystallized from a large volume of acetone by addition of a little methanol. The so obtained 1-(β-dimethylaminoethylamino) - 3 - hydroxy - 3,5 - diphenyl - 4 - (2' - pyridyl) - cyclohexane dimaleate of the formula

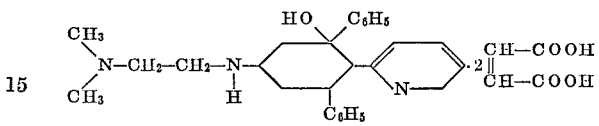

melts at 185–187°.

EXAMPLE 4

A mixture of 5.17 g. of 3,4,5-triphenyl-cyclohexen-2-one, 28 g. of β-dimethylaminoethylamine and 150 ml. of absolute ethanol is refluxed until all the solid dissolves. Platinum oxide (0.5 g.) in 50 ml. of absolute ethanol is then added and the mixture is hydrogenated at 40 p.s.i. for 6 hours. The catalyst is separated, the solution evaporated, the residue dissolved in ether, the solution washed with water, dried and evaporated. The residue is dissolved in 15 ml. of acetone and there is added a solution of 3.3 g. of maleic acid in acetone. The salt formed is recrystallized from pure acetone-methanol and there is obtained 1 - (β - dimethylaminoethylamino) - 3,4,5 - triphenyl-cyclohexane dimaleate of the formula

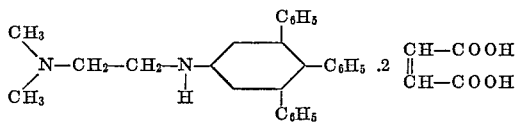

melting at 145–146°.

EXAMPLE 5

340 mg. of the oxime of 3,4,5-triphenyl-cyclohexen-2-one are dissolved in 60 ml. of glacial acetic acid, 2 ml. of concentrated hydrochloric acid are added and hydrogenation is carried out at atmospheric pressure in the presence of 350 mg. of 5% palladium-charcoal. After and evaporation the residue is dissolved in 95% ethanol and treated with saturated ethanolic hydrochloric acid. After evaporating again the residue is triturated with ether to yield crystals of the hydrochloride of 3,4,5-triphenyl-cyclohexylamine melting above 260°. This is dissolved in water and ammonia is added to precipitate the free base. Recrystallization from n-hexane yields the 3,4,5-triphenyl-cyclohexylamine of the formula

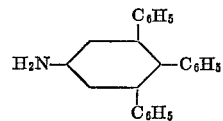

melting at 170.5–172°.

The starting material can be prepared as follows:

1.00 g. of 3,4,5-triphenyl-cyclohexen-2-one, 1.00 g. of hydroxylamine hydrochloride, 5 ml. of pyridine and 5 ml. of absolute ethanol are combined and the mixture refluxed for 4 hours. After evaporation of the solvent the residue is triturated with water, dried and recrystallized from 95% ethanol. The pure oxime melts at 221–223°.

EXAMPLE 6

480 mg. of 3,4,5-triphenyl-cyclohexanol p-toluene sulfonate and 710 mg. of pyrrolidine are dissolved in 25 ml. of purified dioxane, sealed in a pressure bottle and heated in a steam bath for 6 days. Insoluble salts are separated by filtration and the filtrate is evaporated to dryness. The residue is dissolved in methylene chloride, the solution washed with 5% aqueous sodium carbonate solution, dried and evaporated. Upon recrystallization from n-hexane there is obtained the 1-pyrrolidino-3,4,5-triphenyl-cyclohexane of the formula

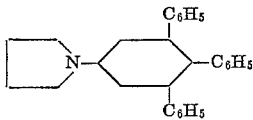

The starting material may be prepared as follows:

To a solution of 2.0 g. of 3,4,5-triphenylcyclohexen-2-one in 200 ml. of ethyl acetate is added approximately 0.5 g. of Raney nickel and the mixture is hydrogenated at atmospheric pressure. Filtration, evaporation and recrystallization of the residue from cyclohexane and from methanol-water yields the 3,4,5-triphenyl-cyclohexanol, M.P. 156–159°.

To a solution of 0.66 g. of 3,4,5-triphenyl-cyclohexanol in 5 ml. of pyridine, 0.475 g. of p-toluenesulfonyl chloride are added and the mixture is heated on the steam bath for 75 minutes. After cooling it is poured into ice water and stirred. The water is decanted from the resulting gum which is then stirred with 5% aqueous sodium carbonate. Decantation of the latter is followed by dissolution of the product in boiling 95% ethanol and a crystalline product separates on cooling. Further recrystallizations from 95% ethanol yield the pure 3,4,5-triphenyl-cyclohexanol p-toluene sulfonate melting at 180–180.5°.

EXAMPLE 7

Using equivalent amounts of piperidine, morpholine, thiamorpholine or N-methyl-piperazine respectively instead of pyrrolidine and following the condensation with 3,5 - diphenyl - 4 - (2' - pyridyl) - cyclohexanone and the hydrogenation of the enamine as shown in Example 1, there is obtained the 1 - piperidino - 3,5 - diphenyl - 4- (2' - pyridyl) - cyclohexane, 1 - morpholino - 3,5 - diphenyl - 4 - (2' - pyridyl) - cyclohexane, 1 - thiamorpholino - 3,5 - diphenyl - 4 - (2' - pyridyl) - cyclohexane or 1 - (4' - methyl - piperazino) - 3,5 - diphenyl - 4 - (2' pyridyl)-cyclohexane respectively.

EXAMPLE 8

Replacing in Example 1 the 3,5-diphenyl-4-(2'-pyridyl)-cyclohexanone by the same amount of 3,5-diphenyl-4 - (3' - pyridyl) - cyclohexanone or 3,5 - diphenyl - 4- (4'-pyridyl)-cyclohexanone respectively, and carrying out the procedure in the analogous manner there is obtained the 1 - pyrrolidino - 3,5 - diphenyl - 4 - (3' - pyridyl) - cyclohexane or 1 - pyrrolidino - 3,5 - diphenyl 4 - (4'-pyridyl)-cyclohexane respectively.

EXAMPLE 9

Using equivalent amounts of 3,5-diphenyl-4-(2'-pyridyl) - cyclohexen - 2 - one instead of 3,4,5 - triphenyl-cyclohexen-2-one and following the procedure shown in Example 4 the 1 - (β - dimethylaminoethylamino) - 3,5-diphenyl - 4 - (2' - pyridyl) - cyclohexane dimaleate is obtained.

EXAMPLE 10

Replacing in Example 6 the 3,4,5-triphenyl-hexanol p-toluene sulfonate by equivalent amounts of 3,5-di-p-tolyl-4-(2'-pyridyl)-hexanol or 3,5-di-p-methoxyphenyl-4-(3'-pyridyl)-hexanol p-toluene sulfonate respectively, and carrying out the reaction with pyrrolidine set forth therein, there is obtained the 1-pyrrolidino-3,5-di-p-tolyl-4-(2'-pyridyl)-cyclohexane or 1-pyrrolidino-3,5-di-p-methoxyphenyl-4-(3'-pyridyl)-cyclohexane respectively.

EXAMPLE 11

Using in Example 1 instead of pyrrolidine and 3,5-diphenyl - 4 - (2' - pyridyl) - cyclohexanone equivalent amounts of (A) Morpholine and 3,5-di-m-chlorophenyl-4-(4'-pyridyl)-cyclohexanone, (B) Piperidine and 3,5-di-p-trifluoromethylphenyl-4-(2'-pyridyl)-cyclohexanone, (C) Diethylamine and 3,5-diphenyl-4-[3'-methyl-pyridyl-(6')]-cyclohexanone or, (D) N-ethyl-piperazine and 2,6-dimethyl-3,5-di-p-dimethylaminophenyl-4-(2'-pyridyl)-cyclohexane, the following compounds are obtained:

(a) 1-morpholino-3,5-di-m-chlorophenyl-4-(4' - pyridyl)-cyclohexane, (b) 1-piperidino-3,5-di-p-trifluoromethylphenyl - 4 - (2'-pyridyl)-cyclohexane, (c) 1-diethylamino - 3,5 - diphenyl-4-[3'-methyl-pyridyl-(6')]-cyclohexane and (d) 1-(4'-ethyl - piperazino)-2,6-dimethyl-3,5-di-p-dimethylaminophenyl-4-(2'-pyridyl)-cyclohexane.

These compounds may be converted into their maleates as shown in Examples 3 or 4.

EXAMPLE 12

The mixture of 2.7 g. 3β,5β-diphenyl-4α-(2-pyridyl)-cyclohexanone, 1.4 g. piperidine, one crystal of p-toluene sulfonic acid and 100 ml. benzene is refluxed under nitrogen for 22 hours while separating the water formed. Thereupon it is evaporated in vacuo and the residue dissolved in 100 ml. absolute ethanol. To the solution 0.7 g. of 10% palladium-charcoal are added and hydrogenation is performed at atmospheric pressure. Hereupon the catalyst is filtered off and the filtrate evaporated. The so-obtained 1ξ-piperidino - 3β,5β - diphenyl-4-α-(2-pyridyl)-cyclohexane of the formula

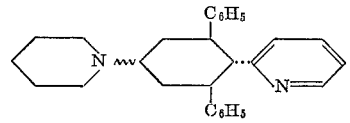

is recrystallized from a small volume of n-hexane; M.P. 129–140°.

The starting material used is prepared as follows: 22.1 g. 2-phenacyl-pyridine and 20.1 g. benzalacetone are added in this order to a stirred solution of sodium ethanolate prepared from 3.2 g. sodium and 300 ml. ethanol at room temperature under nitrogen. After stirring for 10 minutes at room temperature and for 30 minutes at 0° the resulting crystals are collected, triturated with hot ethanol, cooled, filtered and the same is repeated with benzene and after recrystallization from ethanol-methylene chloride the 3-hydroxy-3,5-diphenyl-4-(2-pyridyl)-cyclohexanone melting at 246–248° is obtained.

10.0 g. thereof are added to 30 ml. 85% phosphoric acid in an atmosphere of nitrogen. The solution is stirred and heated to 100° for 1 hour. It is then cooled, poured into 175 ml. water, the mixture is made alkaline with aqueous ammonia and extracted with methylene chloride. The dried extract is evaporated to a small volume and added to excess cyclohexane. Remaining methylene chloride is boiled off and the mixture cooled and filtered. The so-obtained mixture of 4ξ-(2-pyridyl)-3,5β-diphenyl-2-cyclohexanone melts at 122.5–125°. Its cyclohexane solution is separated by thin layer chromatography on silica gel followed by recrystallization from cyclohexane; 4α-epimer (trans) M.P. 140–141°, 4β-epimer (cis) M.P. 170–171.5°.

9.75 g. of the 4α-epimer are dissolved in 300 ml. ethyl acetate and hydrogenated in the presence of 3.0 g. 10% palladium-charcoal at 50 p.s.i. for 15 hours. The catalyst is removed, the filtrate concentrated, chilled and the crystals obtained recrystallized from benzene to obtain the 3β,5β-diphenyl-4α-(2 - pyridyl) - cyclohexanone M.P. 241–242°.

The mother liquors are evaporated, the residual oil dissolved in benzene-methylene chloride and chromatographed on alumina (neutral, activity II–III). Elution with methylene chloride-benzene 1:9 yields the corresponding 3α,4α,5β-epimer melting at 157–158° after recrystallization from cyclohexane.

EXAMPLE 13

The mixture of 3.27 g. 3,5-diphenyl-4-(2-pyridyl)-cyclohexanone, 5.7 g. anhydrous dimethylamine and 250 ml. absolute ethanol is refluxed for a short time and then hydrogenated at atmospheric temperature and pressure using 0.5 g. of 10% palladium-charcoal. After separation of the catalyst and evaporation the residue is recrystallized from n-hexane to yield a 1:1 mixture of the epimeric 1ξ-dimethylamino-3,5-diphenyl-4-(2-pyridyl) - cyclohexane of the formula

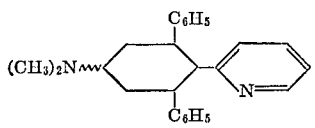

melting at 80–115°. It is separated by thin layer chromatography yielding one epimer melting at 125–126° and the other melting at 134–136°.

EXAMPLE 14

The mixture of 9.72 g. 3,4,5-triphenyl-2-cyclohexanone, 2.34 g. pyrrolidine, 175 ml. benzene and a trace of p-toluene sulfonic acid is refluxed under nitrogen on a water separator for 6 hours. After evaporation the residue is dissolved in 175 ml. absolute ethanol and hydrogenated in the presence of 10% palladium-charcoal and 5 ml. pyrrolidine for 31 hours under normal conditions. Hereupon the mixture is filtered, the filtrate evaporated, the residue dissolved in diethyl ether and through the solution hydrogen chloride is bubbled. The precipitate formed is dissolved in methylene chloride, ethyl acetate is added and the mixture heated to the boil. The white needles separating in the cold are filtered off and recrystallized again in the same manner. There is obtained the high melting epimer of the 1ξ-pyrrolidino-3,4,5-triphenyl-cyclohexane hydrochloride having the formula

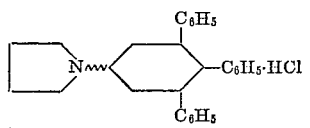

M.P. 246–248°.

The mother liquors are evaporated and the residue treated with aqueous ammonia. The free base is taken up in hexane and chromatographed on alumina. Benzene eluates yield the low melting epimer, which is recrystallized from acetonitrile, M.P. 127–130°.

EXAMPLE 15

3.99 g. 1-pyrrolidino-3-hydroxy-3,5-diphenyl-4-(2-pyridyl)-cyclohexane in 500 ml. 95% ethanol are hydrogenated in the presence of 2 g. platinum oxide at 50 p.s.i. and 80° for 13 hours. After filtration, evaporation and recrystallization from ethanol the 1-pyrrolidino-3-hydroxy-3,5-dicyclohexyl-4-(2-pyridyl)-cyclohexane of the formula

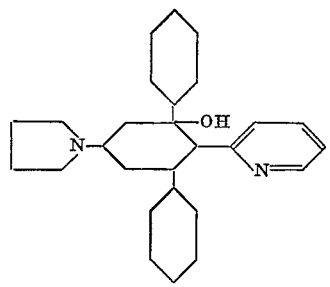

melting at 205–208° is obtained.

EXAMPLE 16

The mixture of 3.27 g. 3,5-diphenyl-4-(2-pyridyl)-cyclohexanone, 1.76 g. β-dimethylamino-ethylamine, 150 ml. absolute ethanol and 0.5 g. 10% palladium-charcoal is hydrogenated at atmospheric temperature and pressure. The oil obtained after filtration and evaporation is taken up in petroleum ether and upon scratching one epimer of the so-obtained 1-(2-dimethylamino-ethylamino)-3,5-diphenyl-4-(2-pyridyl)-cyclohexane having the formula

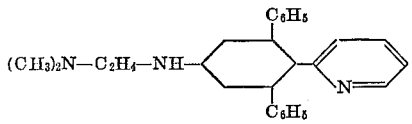

crystallizes and is recrystallized from n-hexane, M.P. 122–124°.

The mother liquor is evaporated, the residue dissolved in diethyl ether and combined with a solution of maleic acid. The resulting salt is filtered off, dissolved in methanol and precipitated again with diethyl ether to yield the hydroscopic dimaleate monohydrate of another epimer of the above compound melting at 110°.

EXAMPLE 17

To the solution of 10 g. 1-pyrrolidino-3-hydroxy-3,5-diphenyl-4-(2-pyridyl)-cyclohexane in 50 ml. dry toluene, 100 ml. propionyl chloride are added dropwise with stirring over a 30 minute period under nitrogen. The mixture is refluxed for 5 hours, then evaporated under reduced pressure, the residue taken up in diethyl ether and the suspension filtered. The filtrate is evaporated and upon addition of n-hexane the residue crystallizes. The so-obtained 1-pyrrolidino-3-propionyloxy-3,5-diphenyl-4-(2-pyridyl)-cyclohexane of the presumed formula

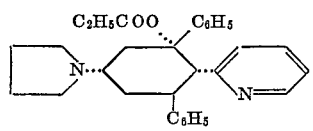

melts after recrystallization from n-hexane at 127–130°.

EXAMPLE 18

The mixture of 3.27 g. 3,5-diphenyl-4-(2-pyridyl)-cyclohexanone, 275 ml. absolute ethanol, 4.3 g. anhydrous ammonia and 0.5 g. 10% palladium-charcoal is hydrogenated at atmospheric temperature and pressure. After filtration and evaporation the obtained crystalline 1-amino-3,5-diphenyl-4-(2-pyridyl)-cyclohexane of the formula

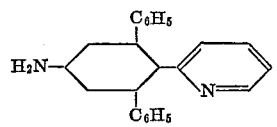

melts upon recrystallization from benzene-cyclohexane at 157.5–158.5°.

EXAMPLE 19

5.2 g. of the 1ξ-piperidino-3β,5β-diphenyl-4α-(2-pyridyl)-cyclohexane, obtained according to Example 12, are dissolved in 25 ml. ethanol and the solution chilled and filtered. The filtrate is evaporated and the residue recrystallized from n-hexane and acetonitrile to yield the 1β-piperidino-3β,5β-diphenyl-4α-(2-pyridyl)-cyclohexane of the formula

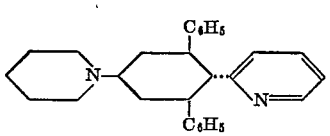

melting at 171–173° (equatorial epimer).

The hexane mother liquor is evaporated and the residue recrystallized from ethanol and acetonitrile to yield the corresponding 1α-epimer (axial) M.P. 148–150°.

EXAMPLE 20

The mixture of 3.27 g. 3β,5β-diphenyl-4α-(2-pyridyl)-cyclohexanone, 5.7 g. dimethylamine, 0.5 g. palladium-charcoal and 250 ml. absolute ethanol is hydrogenated under atmospheric pressure. After filtration and evaporation the residue is dissolved in diethyl ether and the solution filtered. The filtrate is freed from ether by distillation while maintaining the volume by addition of n-hexane. The hexane solution is filtered and the filtrate concentrated. Upon chilling crystals of the 1ξ-dimethylamino-3β,5β-diphenyl-4α-(2-pyridyl)-cyclohexane having the formula

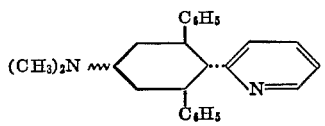

separate, melting at 80–115°.

6.0 g. thereof are dissolved in 25 ml. hot n-hexane and upon cooling the precipitate is filtered off and recrystallized from acetonitrile yielding the corresponding 1β-epimer (equatorial) melting at 132–133°.

The combined mother liquors are evaporated and the remaining 1α-epimer (axial) is dissolved in n-hexane, separated by thin layer chromatography on silica gel and recrystallized from n-hexane, M.P. 122–124°.

EXAMPLE 21

The mixture of 6.52 g. 3β-4α,5β-triphenyl-cyclohexanone, 1.75 g. pyrrolidine, a trace of p-toluene sulfonic acid and 100 ml. benzene is refluxed under nitrogen for 12 hours on a water trap. The residue after evaporation is dissolved in 100 ml. absolute ethanol, containing 1.0 g. 10% palladium-charcoal, and hydrogenated for 2 hours at normal conditions. After filtration and evaporation the residue is dissolved in diethyl ether, the solution filtered, evaporated and the residue dissolved in methylene chloride. The solution is washed with several portions of 0.1 N hydrochloric acid, dried and evaporated. The residue is triturated with diethyl ether, then suspended in ether-water and mixed with aqueous ammonia. The ether layer is separated, dried and evaporated and the residue purified on alumina (neutral, activity II–III). The cyclohexane eluate yields the 1ξ-pyrrolidino-3β,4α,5β-triphenyl-cyclohexane of the formula

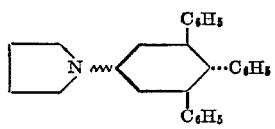

melting after recrystallization from acetonitrile at 93.5–96°.

The starting material is prepared as follows:

19.44 g. of the 3,4α,5β-triphenyl-2-cyclohexenone [Bull. Soc. Chim. France 52, 195–200 (1935)] are dissolved in 250 ml. ethyl acetate-ethanol 1:1 and hydrogenated at 45 p.s.i. in the presence of 4.0 g. 10% palladium-charcoal for 3 hours. After filtration evaporation, fractional crystallization and recrystallization from methanol, the 3β,4α,5β-triphenyl-cyclohexanone, M.P. 174–176.5°, is obtained. From the mother liquors a smaller amount of the 3α,4α,5β-triphenyl-cyclohexanone, M.P. 204–206° is obtained.

EXAMPLE 22

The mixture of 2.5 g. 3β,5β-diphenyl-4α-(2-pyridyl)-cyclohexanone, 6.9 g. n-propylamine, 0.3 g. 10% palladium-charcoal and 100 ml. absolute ethanol is hydrogenated at atmospheric pressure for 3 hours. The oil obtained after filtration and evaporation is dissolved in diethyl ether, the solution washed with water, dried and concentrated to 35 ml. 1.4 g. maleic acid in 8 ml. acetone are added and the crystals formed collected and recrystallized from ethanol-diethyl ether yielding the 1ξ-n-propylamino-3β,5β-diphenyl-4α-(2-pyridyl)-cyclohexane maleate monohydrate of the formula

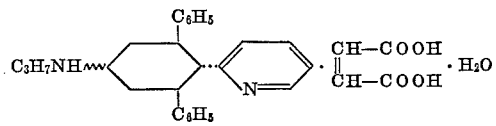

melting at 189–190°.

EXAMPLE 23

2.5 g. 3β,5β-diphenyl-4α-(2-pyridyl)-cyclohexanone, 1.52 g. N-methyl-piperazine and a trace of p-toluene sulfonic acid are heated in 70 ml. refluxing toluene for 24 hours, separating the water formed. The mixture is evaporated in vacuo, the residue suspended in 100 ml. absolute ethanol and hydrogenated in the presence of 0.5 g. 10% palladium-charcoal at normal conditions for 4½ hours. After filtration and evaporation the residue is dissolved in petroleum ether, the solution filtered, the filtrate evaporated, the residue taken up in diethyl ether and added to an acetonic solution of maleic acid. The precipitated 1ξ-(4-methyl-piperazino)-3β,5β-diphenyl-4α-(2-pyridyl)-cyclohexane dimaleate monohydrate of the formula

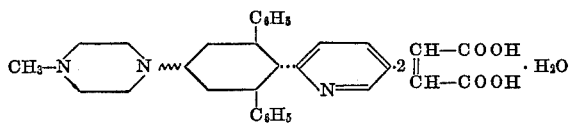

is recrystallized from methanol-diethyl ether, M.P. 187–189° (dec.).

EXAMPLE 24

The mixture of 1.6 g. 3α,4α,5β-triphenyl-cyclohexanone, 0.71 g. pyrrolidine, a crystal of p-toluene sulfonic acid and 25 ml. benzene is refluxed under nitrogen and on a water trap for 17 hours and then evaporated. The residue is dissolved in 25 ml. absolute ethanol, containing 0.25 g. 10% palladium-charcoal, and hydrogenated for 2½ hours. The residue obtained after filtration and evaporation is dissolved in methylene chloride, the solution washed with 0.1 N hydrochloric acid, dried and evaporated. The residue is triturated with diethylether, suspended in ether-water 2:1, and made alkaline with aqueous ammonia. The ether layer is evaporated, the residue dissolved in n-hexane, chromatographed on alumina (neutral, activity II–III), eluted with n-hexane and recrystallized from acetonitrile yielding the 1α-pyrrolidino-3α-4α,5β-triphenyl-cyclohexane of the formula

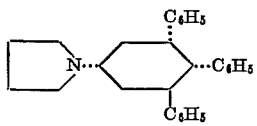

melting at 148–151°.

The corresponding 1β-epimer is eluted with benzene and melts after recrystallization from n-hexane at 124–126°.

EXAMPLE 25

The mixture of 4.9 g. 3β,5β-diphenyl-4α-(2-pyridyl)-cyclohexanone, 5.74 g. morpholine, one crystal of p-toluene sulfonic acid and 100 ml. benzene is refluxed under nitrogen and on a water trap for 22 hours. It is evaporated, the residue dissolved in 100 ml. absolute ethanol, containing 0.5 g. 10% palladium-charcoal, and hydrogenated for 2½ hours. After filtration and evaporation the residue obtained is separated by fractional crystallization from n-hexane yielding the 1β-morpholino-3β,5β-diphenyl-4α-(2-pyridyl)-cyclohexane of the formula

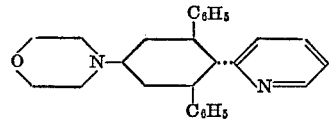

melting at 166–167°.

The corresponding 1α-compound is obtained from the concentrated mother liquors and melts at 159–161°.

EXAMPLE 26

The mixture of 6.54 g. 3β,5β-diphenyl-4α-(2-pyridyl)-cyclohexanone, 28.8 g. pyrrolidine, 0.5 g. 10% palladium-charcoal and 200 ml. absolute ethanol is hydrogenated for 2 hours. The catalyst is removed, the solvent evaporated, the residue dissolved in hot n-hexane, the solution filtered through charcoal and concentrated. On cooling white crystals separate, representing the 1α-pyrrolidino-3β,5-β-diphenyl-4α-(2-pyridyl)-cyclohexane of the formula

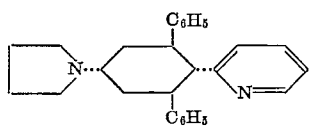

melting at 107–110°.

The mother liquor is evaporated and the residue recrystallized twice from n-hexane yielding the corresponding 1β-epimer M.P. 129–131°.

EXAMPLE 27

The solution of 1.91 g. 1α-pyrrolidino-3β,5β-diphenyl-4α-(2-pyridyl)-cyclohexane and 6.84 g. methyliodide in 15 ml. anhydrous methanol is allowed to stand at room temperature under nitrogen for 6 days. The yellow crystals formed are filtered off and washed with methanol; they represent the 1α-pyrrolidino-3β,5β-diphenyl-4α-(2-pyridinium)-cyclohexane methoiodide of the formula.

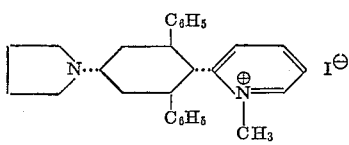

melting at 239–241°.

1.65 g. thereof are dissolved in 200 ml. 95% ethanol and the solution passed slowly through a column of 50 ml. Amberlite IRA–400 chloride form, which hereupon is washed with 150 ml. ethanol. The eluate is concentrated to a small volume and added with stirring to ethyl acetate. The chilled mixture is filtered and the corresponding chloride hemihydrate collected, M.P. 245–247° (dec.).

EXAMPLE 28

3.825 g. 1α-pyrrolidino-3β,5β-diphenyl-4α-(2-pyridyl)-cyclohexane are dissolved in 100 ml. glacial acetate acid and 2.0 ml. 30% hydrogen peroxide are added. The solution is kept at 75–80° for 3 hours, mixed with another 1.6 ml. hydrogen peroxide and maintained for 9 hours at this temperature. Hereupon it is concentrated in vacuo to about 15 ml. 100 ml. water are added and then evaporated to dryness. To the residue 5 ml. water and an excess of solid sodium carbonate is added and the whole extracted with methylene chloride. The dried extract is filtered, chilled to −5° and filtered again. The white precipitate obtained is washed with cold methylene chloride and dried to yield the bis-N-oxide of 1α-pyrrolidino-3β,5β-diphenyl-4α-(2-pyridyl)-cyclohexane hemihydrate of the formula

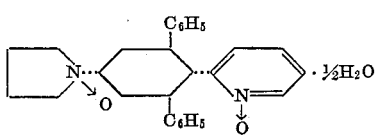

melting at 176–176.5°.

EXAMPLE 29

The mixture of 6.9 g. 3β,5β-diphenyl-4α-(2-pyridyl)-cyclohexanone, 3 ml. Δ³-pyrroline, 0.01 g. p-toluene sulfonic acid and 125 ml. dry benzene is refluxed under nitrogen and on a water trap for 1½ hours and hereupon evaporated. The residue is dissolved in 20 ml. benzene, 0.82 ml. 97% formic acid are added, the solution refluxed for 2 hours under nitrogen and evaporated. The residue is purified by thin layer chromatography on silica gel and eluted with benzene-ethyl acetate 1:1 yielding the 1α-(Δ³-pyrrolino) - 3β,5β - diphenyl - 4α - (2-pyridyl)-cyclohexane of the formula

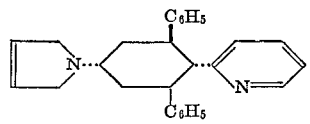

which melts after recrystallization from n-hexane at 132°.

EXAMPLE 30

The mixture of 500 mg. 3,5-diphenyl-4-(2-pyridyl)-cyclohexanone, 0.4 ml. pyrrolidine, a trace of p-toluene sulfonic acid 20 ml. benzene is refluxed for 19 hours while separating the water formed. Hereupon it is evaporated, the residue dissolved in 25 ml. absolute ethanol and hydrogenated in the presence of 250 mg. 10% palladium-charcoal. After filtration and evaporation the resulting 1-pyrrolidino-3,5-diphenyl-4-(4-pyridyl)-cyclohexane of the formula

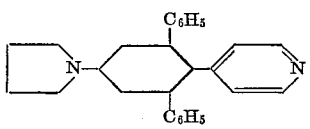

is recrystallized from acetonitrile and melts at 162–165°.

The starting material is obtained as follows:

0.35 g. sodium are dissolved in 100 ml. absolute ethanol and the solution stirred with 2.95 g. 4-phenacyl-pyridine and 2.19 g. benzalacetone overnight at room temperature. The reaction mixture is poured into water, extracted with benzene, the extract dried and evaporated in vacuo. The residue is dissolved in benzene-diethyl ether 1:1, the solution filtered through a 6 inch column of silica gel and the column eluted with methylene chloride. After recrystallization from methanol the so-obtained 3,5-diphenyl-4-(4-pyridyl)-2-cyclohexenone melts at 240–242°.

1.0 g. thereof in 100 ml. ethyl acetate is hydrogenated at atmospheric pressure in the presence of 1.0 g. 10% palladium-charcoal and the 1-hydroxy-3,5-diphenyl-4-(4-pyridyl)-cyclohexane obtained recrystallized from ethyl acetate, M.P. 193–194°.

300 mg. thereof in 7 ml. acetone are treated at 5° with 1.0 ml. of 8 N-chromic acid in acetone. The mixture is stirred for 15 minutes, then made alkaline with 15% aqueous potassium hydroxide and diluted with water and diethyl ether. The organic layer is separated, dried and evaporated in vacuo to yield the 3,5-diphenyl-4-(4-pyridyl)-cyclohexanone melting at 236–240° after recrystallization from ethanol.

EXAMPLE 31

The mixture of 2.54 g. 3,5-di-(2-furyl)-4-(2-pyridyl)-cyclohexanone, 1.16 g. pyrrolidine and 50 ml. benzene is refluxed for 18 hours on a water separator. It is then evaporated in vacuo, the residue dissolved in 40 ml. absolute ethanol and hydrogenated in the presence of 750 mg. 10% palladium-charcoal. After filtration and evaporation the resulting 1-pyrrolidino-3,5-di-(2-furyl)-4-(2-pyridyl)-cyclohexane of the formula

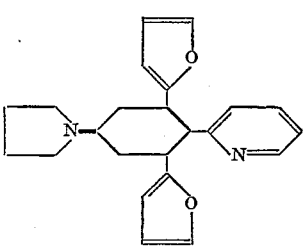

melts after recrystallization from ethyl acetate at 70–75°.

The starting material is prepared as follows:

230 mg. sodium are dissolved in 100 ml. absolute ethanol and to the stirred solution 1.87 g. 2-furyl-2-picolylketone in 5 ml. ethanol are added, and after 5 minutes 1.35 g. furfural-acetone in 5 ml. ethanol. and stirring is continued at room temperature for 6 hours. The mixture is poured into water, extracted with benzene, the extract washed with water, dried and evaporated in vacuo. The residue is dissolved in diethyl ether, passed through a 6 inch column of silica gel and the filtrate evaporated. The resulting 3,5-di-(2-furyl)-4-(2-pyridyl)-2-cyclohexenone melts after recrystallization from ethanol at 157–159°.

2.3 g. thereof, dissolved in 50 ml. ethyl acetate, are hydrogenated for 24 hours under a pressure of 50 lb. in the presence of 2 g. 10% palladium-charcoal at room temperature. After filtration and evaporation the residue is dissolved in benzene, the solution chromatographed on alumina (neutral, activity II–III) and the so-obtained 3,5-di-(2-furyl)-4-(2-pyridyl) - cyclohexanone recrystallized from n-propanol, M.P. 119–121°.

EXAMPLE 32

The mixture of 1.7 g. 3,5-diphenyl-4-(4-pyrimidyl)-cycyohexanone, 1.0 ml. pyrrolidine and 50 ml. benzene is refluxed for 3 hours under nitrogen on a water trap and then evaporated. The residue is dissolved in 100 ml. absolute ethanol and hydrogenated in the presence of 1.0 g. palladium-charcoal at atmospheric pressure. The mixture is filtered, the filtrate evaporated, the residue taken up in diethyl ether and the solution filtered through silica gel and evaporated. The resulting 1-pyrrolidino-3,5-diphenyl-4-(4-pyrimidyl)-cyclohexane of the formula

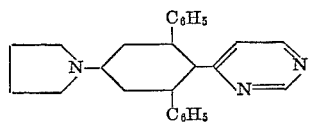

is recyrstallized from ethyl acetate, M.P. 190–195°.

The starting material is prepared as follows:

300 mg. sodium are dissolved in 500 ml. absolute ethanol and the solution refluxed with 20.9 g. 4-phenacyl-pyrimidine and 15.4 g. benzalacetone for 18 hours. The chilled mixture is filtered and the 3-hydroxy-3,5-diphenyl-4-(4-pyrimidyl)-cyclohexanone obtained recrystallized from ethanol, M.P. 244–246°.

21.1 g. thereof are dissolved in 500 ml. absolute ethanol containing 4.5 g. 85% phosphoric acid and the solution refluxed for 4 hours. The chilled mixture is poured onto ice and the resulting 3,5-diphenyl-4-(4-pyrimidyl)-2-cyclohexenone filtered off and recrystallized 2 times from ethanol, M.P. 177–180°.

2.0 g. thereof in 80 ml. ethyl acetate are hydrogenated for 43 hours in the presence of 1.0 g. 10% palladium-charcoal at normal conditions. After filtration and evaporation the resulting 3,5-diphenyl-4-(4-pyrimidyl)-cyclohexanone is recrystallized from methanol and melts at 262–264°.

EXAMPLE 33

The mixture of 4.51 g. 3,5-diphenyl-4-(2-quinolyl)-cyclohexanone, 5 ml. pyrrolidine and 150 ml. benzene is refluxed for 16 hours under nitrogen on a water trap. It is then hydrogenated under atmospheric pressure at room temperature in the presence of 1.0 g. platinum oxide and the hydrogenation is stopped after the required volume hydrogen has been consumed. The mixture is filtrated and the filtrate evaporated to yield the oily 1-pyrrolidino-3,5-diphenyl-4-(2-quinolyl)-cyclohexane of the formula

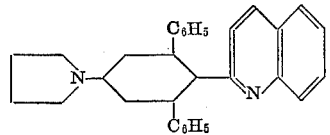

It shows in the I.R. spectrum (Nujol) bands at 1610, 1140, 825, 755 and 695μ.

The starting material is prepared as follows:

To a solution of 114 g. phenyl lithium in 1500 ml. diethyl ether 200 g. quinaldine are added dropwise during 20 minutes. After refluxing for 1 hour 105 g. ethyl benzoate are added during 25 minutes and the mixture is again refluxed for 1 hour. After cooling 300 ml. water are added cautiously then 1700 g. ice and the whole is acidified with hydrochloric acid. The orange precipitate formed is filtered off, the aqueous filtrate washed with diethyl ether, made alkaline with sodium hydroxide and extracted with methylene chloride. Upon evaporation more orange solid is obtained, which is combined with the first filter residue. It is treated with aqueous sodium hydroxide and recrystallized from methylene chloride-pentane and then from cyclohexane yielding the 2-phenacyl-quinoline, M.P. 118°.

60.2 g. thereof are added to a solution of 5.61 g. sodium in 875 ml. anhydrous ethanol under nitrogen and the suspension is kept at 70° for one hour. Hereupon 35.6 g. benzalacetone in 150 ml. ethanol are added and the mixture stirred for 2 hours at 50°. After standing at room temperature overnight the mixture is filtered, the residue washed with water and dried in vacuo to yield the 3-hydroxy-3,5-diphenyl-4-(2-quinolyl)-cyclohexanone melting after recrystallization from methylene chloride-diethyl ether at 203°.

64.6 g. thereof are suspended in 250 ml. 85% phosphoric acid and heated on a steam cone for 2 hours. After cooling the mixture is poured into 1000 ml. water, the whole is chilled, made basic with aqueous ammonia, extracted with methylene chloride and the extract evaporated. The remaining 3,5-diphenyl-4-(2-quinolyl)-2-cyclohexenone is recrystallized from methylene chloride-diethyl ether, M.P. 149°.

5.0 g. thereof are dissolved in 100 ml. ethyl acetate and hydrogenated at normal conditions in the presence of 1 g. platinum oxide. The reduction is stopped after consumption of 2 mol equivalents of hydrogen. The mixture is filtered, the filtrate evaporated and the remaining 3,5-diphenyl-4-(2-quinolyl)-cyclohexanol dissolved in 100 ml. acetone. The solution is cooled in an ice bath, treated with a 50% excess of 8 N chromic acid (with regard to oxygen) and stirred for 20 minutes. It is then alkalinized with aqueous ammonia, extracted with methylene chloride, the extract concentrated and filtered through silica gel. The filtrate is evaporated and the remaining 3,5-diphenyl-4-(2-quinolyl)-cyclohexanone recrystallized from diethyl ether, M.P. 200–203°.

EXAMPLE 34

The mixture of 3.4 g. 3β,5β-di(4-methoxy-phenyl)-4α-(2-pyridyl)-cyclohexanone, 2 ml. pyrrolidine and 100 ml. benzene is refluxed on a water trap for 4 hours, then cooled to room temperature and hydrogenated in the presence of 2 g. 10% palladium-charcoal for ½ hour. After filtration and evaporation the residue is dissolved in 10 ml. diethyl ether, 10 ml. pentane are added and the whole is chromatographed on 97.5 alumina (neutral activity I). The column is eluted with 830 ml. diethyl ether-pentane 1:1 yielding product A, and 420 ml. diethyl ether yielding product B.

0.9 g. of B are dissolved in 50 ml. boiling petroleum ether and the solution concentrated to 5 ml. Upon standing the 1β-pyrrolidino-3β,5β-di-(4-methoxy-phenyl)-4α-(2-pyridyl)-cyclohexane of the formula

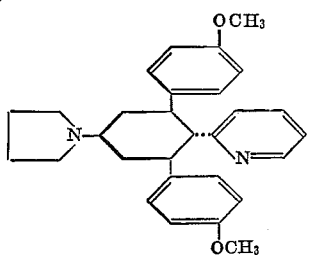

separates, M.P. 129–131°.

2.0 g. of product A and 1.06 g. maleic acid are dissolved in 5 ml. acetone and the solution is evaporated in vacuo. The residue is dissolved in 20 ml. methylene chloride and 50 ml. boiling ethyl acetate are added. After cooling the crystals formed are collected representing the dimaleate of the corresponding 1α-compound, M.P. 147–150° after another crystallization. The free oily base liberated with aqueous ammonia shows in the UV-spectrum (methanol) bands at 226–257 (shoulder) 263, 269.7, 276 (shoulder) and 284 mμ, ε=23330, 4140, 6270, 4670, 3210 and 2370 respectively.

The starting material is prepared as follows:

To the stirred mixture of 272.28 g. anisaldehyde, 434 ml. acetone and 200 ml. water, kept beneath 25°, 50 ml. 10% aqueous sodium hydroxide are added within ½ hour and the mixture is stirred for 3 hours. Hereupon 140 ml. 10% hydrochloric acid are added, the organic layer separated and the aqueous layer extracted with methylene chloride. The combined organic solutions are washed with water, dried and evaporated. The residue is distilled and the fraction boiling at 191–195/21 mm. collected, representing the 4-methoxy-benzalacetone, M.P. 73–75° (cyclohexane).

The solution of 1.35 g. phenyl lithium in 650 ml. benzene-diethylether is mixed with 850 ml. anhydrous diethylether and while stirring 134 ml. picoline are added within 10 minutes. After refluxing for 1 hour 116 g. methyl 4-methoxybenzoate in 250 ml. diethyl ether are added to the cold solution within 20 minutes and the hole is refluxed for 1 hour. Hereupon 300 ml. water are added and after ½ hour of stirring it is poured onto 260 ml. concentrated hydrochloric acid in 1700 g. ice. The ethereal layer is separated and extracted with 20% hydrochloric acid. The aqueous phase is made basic with sodium hydroxide and then extracted with diethyl ether. The extracts are washed with water and evaporated. The remaining α-(2-pyridyl)-4-methoxy-acetophenone is distilled and the fraction boiling at 162°/0.05 mm. collected, M.P. 89–91° (petroleum ether). 103.3 g. thereof are added to a solution of 10.6 sodium in 750 ml. anhydrous ethanol, kept under nitrogen, followed by 81 g. 4-methoxy-benzalacetone in 250 ml. ethanol within about ½ hour. After one hours stirring at room temperature the mixture is filtered, the residue triturated with ethanol and water, recrystallized from acetonitrile-benzene and finally washed with ethanol to yield the 3-hydroxy-3,5β-di-(4-methoxy-phenyl) - 4α - (2-pyridyl)-cyclohexanone, M.P. 258–262°.

50 g. thereof are dehydrated in 130 ml. 85% phosphoric acid for 1 hour at 100° yielding the corresponding Δ²-compound melting at 100–110° after recrystallization from diethyl ether.

20 g. thereof are hydrogenated in 200 ml. ethyl acetate containing 8 g. 10% palladium-charcoal for 36 hours to yield the desired 3β,5β-di-(4-methoxy-phenyl)-4α-(2-pyridyl)-cyclohexanone which melts at 242–244° after recrystallization from ethyl acetate.

EXAMPLE 35

1.08 g. 1α-pyrrolidino-3β,5β-di-(4-methoxy-phenyl)-4α-(2-pyridyl)-cyclohexane are heated in a sealed tube with 5 ml. concentrated hydrochloric acid for 2 hours to 165°. After evaporation to dryness the residue is dissolved in 12 ml. water, the solution made basic with aqueous ammonia, the precipitate collected and recrystallized from methanol, it represents the 1α-pyrrolidino-3β,5β-di - (4-hydroxy-phenyl) - 4α - (2-pyridyl) - cyclohexane of the formula

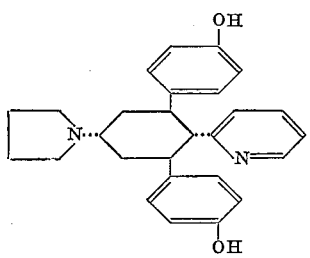

M.P. 254–264°.

The corresponding 1β-starting material is also treated with hydrochloric acid leaving a crystalline hydrochloride of the phenole M.P. 338–340°. The analogously liberated base melts at 248–250°.

EXAMPLE 36

The mixture of 6.0 g. 3-hydroxy-3,5β-di-(4-methoxy-phenyl)-4α-(2-pyridyl)-cyclohexanone, 2 ml. pyrrolidine and 90 ml. benzene is refluxed for 12 hours on a water trap. Hereupon it is hydrogenated in the presence of 1.5 g. platinum oxide until one mole equivalent hydrogen is absorbed. After filtration and evaporation the resulting oily 1ξ-pyrrolidino-3-hydroxy-3,5β-di - (4-methoxy-phenly)-4α-(2-pyridyl)-cyclohexane of the formula

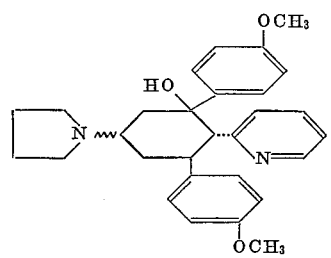

is obtained, it shows in the I.R. spectrum (Nujol) bands at 1630, 1250, 1050, 840 and 760μ.

EXAMPLE 37

The mixture of 3 g. 3β,5β-di-(4-chloro-phenyl)-4α-(2-pyridyl)-cyclohexanone, 2 ml. pyrrolidine and 90 ml. benzene is refluxed for 12 hours on a water trap. Hereupon it is hydrogenated in the presence of 1.5 g. platinum oxide for 35 minutes, wherein one mol equivalent hydrogen is absorbed. After filtration and evaporation the remaining oily 1ξ-pyrrolidino-3β,5β-di(4-chloro-phenyl)-4α-(2-pyridyl)-cyclohexane of the formula

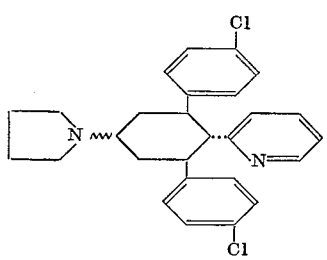

is obtained, it shows in the I.R. spectrum (Nujol) bands at 1590, 1150, 1085, 1005, 810 and 760μ.

The starting material is prepared analogous to the method shown in Example 34: 4-chloro-benzalacetone M.P. 58–60° (pentane), α-(2-pyridyl)-4-chloro-acetophenone B.P. 163°/0.06 mm., M.P. 84–86°, 3-hydroxy-3,5β-di-(4-chloro-phenyl)- 4α -(2-pyridyl)-cyclohexanone M.P. 254–256° (ethanol-methylene chloride-diethyl-ether), 3,5β-di-(4-chloro-phenyl)-4α-(2-pyridyl)-2-cyclohexenone M.P. 128–130° (diethyl ether).

11.8 g. of the latter are hydrogenated in 100 ml. methanol in the presence of platinum oxide and after 3 hours 2 mol equivalents hydrogen are absorbed. After filtration and evaporation the remaining 3β,5β-di-(4-chloro-phenyl)-4α-(2-pyridyl)-cyclohexanol is dissolved in 240 ml. acetone and to the stirred solution 12 ml. of Kiliani agent are dropped in at 10° and the whole is stirred for additional 10 minutes. The orange mixture is diluted with 600 ml. water, made basic with aqueous ammonia, extracted with methylene chloride and the extract filtered through silica gel. The dried filtrate is evaporated and the remaining 3β,5β-di-(4-chloro-phenyl)-4α-(2-pyridyl)-cyclohexanone recrystallized from diethyl ether. M.P. 222–224°.

EXAMPLE 38

The mixture of 3.0 g. 3β-(4-chloro-phenyl)-4α-(2-pyridyl) - 5β - (4-methoxy-phenyl) - cyclohexanone, 2 ml. pyrrolidine and 90 ml. benzene is refluxed on a water trap for 12 hours and hereupon hydrogenated in the presence of 1.5 g. platinum oxide. After filtration and evaporation the remaining oil 1ξ-pyrrolidino-3β-(4-chloro-phenyl)- 4α -(2-pyridyl)- 5β -(4-methoxy-phenyl)-cyclohexane of the formula

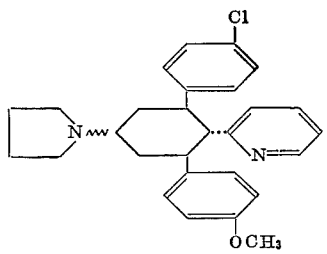

shows in the I.R. spectrum (Nujol) bands at 1620, 1600, 1250, 825 and 750μ.

The starting material is prepared as shown in Example 34: 3 - hydroxy - 3 - (4-methoxy-phenyl) - 4α - (2-pyridyl)-5β-(4-chloro-phenyl)-cyclohexanone M.P. 234–236° (diethyl ether-methylene chloride), corresponding Δ²-compound M.P. 110–112° (ethanol) and 3β-(4-chloro-phenyl)- 4α -(2-pyridyl)- 5β -(4-methoxy-phenyl)-cyclohexanone M.P. 219–220° (diethyl ether).

EXAMPLE 39

The mixture of 2.22 g. 3β,5β-di-(3,4,5-trimethoxyphenyl)-4α-(2-pyridyl)-cyclohexanone, 1.84 ml. pyrrolidine and 100 ml. benzene is refluxed for 18 hours on a water trap. Hereupon 0.5 g. platinum oxide are added and the mixture is hydrogenated at normal conditions until 1 mol equivalent hydrogen is consumed. After filtration and evaporation the remaining 1ξ-pyrrolidino-3β,5β-di - (3,4,5-trimethoxy-phenyl) - 4α - (2-pyridyl) - cyclohexane of the formula

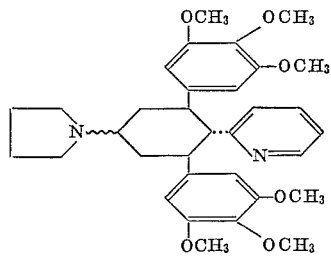

is recrystallized from ethyl acetate-diethylether and melts at 145°.

The starting material is prepared according to the method described in Example 34: 3,4,5-trimethoxy-benzalacetone M.P. 92° (diethyl ether), α-(2-pyridyl)-3,4,5-trimethoxy-acetophenone B.P. 212–220°/0.3 mm., 3-hydroxy-3,5β-di-(3,4,5 - trimethoxyphenyl)-4α-(2-pyridyl)-cyclohexanone M.P. 231–233° (methylene chloride-diethyl ether), 3,5β-di-(3,4,5-trimethoxy-phenyl)-4α-(2-pyridyl)-2-cyclohexanone M.P. 146° (methylene chloride-diethyl ether).

17.72 g. thereof, dissolved in 200 ml. ethyl acetate, are hydrogenated at atmospheric pressure in the presence of 4.2 g. platinum oxide until 2.1 mol equivalents of hydrogen are consumed. After filtration and evaporation 17.7 g. of the corresponding alcohol obtained are dissolved in 230 ml. acetone and 15 ml. of an 8 molar chromic acid solution are added while chilling in an ice bath. After stirring for ¾ hours the mixture is alkalinized with aqueous ammonia and extracted with methylene chloride. The dried extract is evaporated, the residue dissolved in benzenemethylene chloride and chromatographed on alumina (neutral, activity I) to yield the 3β,5β-di-(3,4,5-trimethoxy-phenyl)-4α-(2-pyridyl)-cyclohexanone melting at 175–177°.

EXAMPLE 40

To a 14.02% solution and 1.54 g. n-butyl lithium in hexane, diluted with 100 ml. dry diethyl ether and kept at —60° under nitrogen, 4.1 g. 2-bromo-pyridine in 25 ml. diethyl ether are added dropwise with stirring. To the so-obtained stirred solution of 2-pyridyl lithium, 2.0 g. 4-pyrrolidino-cyclohexanone in 25 ml. diethyl ether are added dropwise during 45 minutes at —60° and stirring is continued for 2 hours more. Thereupon 25 ml. ethanol and 25 ml. water are added, the solution warmed up to room temperature and evaporated in vacuo. The residue is taken up in 75 ml. methylene chloride and the solution extracted with 10% hydrochloric acid. The aqueous layer is made basic with aqueous ammonia, extracted with methylene chloride and the dried extract evaporated. The residue is triturated with diethyl ether-petroleum ether, the crystals filtered off and recrystallized from n-hexane to yield the 1-pyrrolidino-4-hydroxy-4-(2-pyridyl)-cyclocyclohexene of the formula

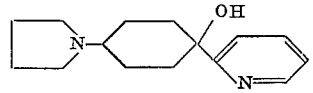

melting at 112–114°.

5.7 g. thereof are heated in 8.5 ml. concentrated sulfuric acid to 120–130° for one hour. The solution is poured onto ice, made basic with aqueous sodium hydroxide, extracted with methylene chloride, the extract dried and evaporated. The resulting 1-pyrrolidino-4-(2-pyridyl)-3-cyclohexane of the formula

is recrystallized from n-hexane and melts at 63–65°.

5.0 g. thereof are dissolved in 75 ml. 95% ethanol and hydrogenated in the presence of 0.3 g. 10% palladium-charcoal. After removal of the catalyst and evaporation the residue is distilled and the fraction boiling at 146–148°/0.1 mm. collected; it represents the 1-pyrrolidino-4-(2-pyridyl)-cyclohexane of the formula

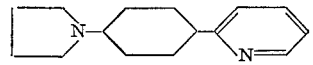

The starting material is prepared as follows:

The mixture of 2.18 g. 4-benzoyl-cyclohexanone, 1.42 g. pyrrolidine, one crystal of p-toluene sulfonic acid and 60 ml. benzene is refluxed for 7 hours on a water trap. The solution is evaporated in vacuo, the residue suspended in 100 ml. absolute ethanol and hydrogenated in the presence of 0.6 g. 10% palladium charcoal at normal conditions. After filtration and evaporation the residue is triturated with petroleum ether, filtered and the filtrate evaporated yielding the oily 1-pyrrolidino-4-benzoyl-cyclohexane.

2.0 g. thereof are dissolved in 40 ml. methanol, to the solution 20 ml. 0.5 N sodium hydroxide are added, the whole is refluxed for 3 hours and then evaporated in vacuo. To the residue water is added, the mixture extracted with methylene chloride, the extract washed with water, dried and evaporated yielding the 4-pyrrolidino-cyclohexanol melting after recrystallization from n-hexane at 81–83°.

25.0 g. thereof are dissolved in 125 ml. glacial acetic acid and the solution added dropwise to a stirred mixture of 15 g. chromium trioxide, 25 ml. water and 125 ml. glacial acetic acid within about 1 hour and keeping the temperature below 35°. The reaction mixture is stirred over night at room temperature, made basic with aqueous ammonia and potassium carbonate, extracted with methylene chloride, the extract dried and evaporated. The purple residue is dissolved in n-hexane, the solution filtered, the filtrate chromatographed on neutral alumina, the eluate evaporated, the residue distilled and the fraction boiling at 100–106°/0.25 mm. collected; it represents the desired 4-pyrrolidino-cyclohexanone.

EXAMPLE 41

The mixture of 3.5 g. 4-(2-pyridyl)-cyclohexanone 1.42 g. pyrrolidine, a trace of p-toluene sulfonic acid and 60 ml. benzene is refluxed under nitrogen for 6 hours on a water trap. It is evaporated in vacuo, the residue dissolved in 150 ml. absolute ethanol and hydrogenated in the presence of 0.6 g. 10% palladium-charcoal at normal conditions. After filtration and evaporation the resulting 1-pyrrolidino-4-(2-pyridyl)-cyclohexane is distilled and the fraction boiling at 147–149°/0.1 mm. collected; it is identical with that obtained according to Example 40.

The starting material is prepared as follows:

To the mixture of 8.2 g. n-butyl-lithium in a 1.6 M hexane solution and 500 ml. diethyl ether, kept at −60° and under nitrogen, the solution of 20.0 g. 2-bromo-pyridine in 100 ml. diethyl ether is added dropwise with stirring. Hereupon 10.0 g. 1,4-cyclohexadione monoethylene ketal (Helv. Chim. Acta, 1957, p. 1621) in 100 ml. diethyl ether are added during 1 hour and stirring is continued for 2 hours at −60°. Then 50 ml. ethanol followed by 50 ml. water are added and the mixture is allowed to warm up to room temperature. After evaporation under reduced pressure the residue is taken up in methylene chloride the solution extracted with 10% hydrochloric acid, the aqueous extract made basic with aqueous ammonia and again extracted with methylene chloride. The organic layer is dried and evaporated yielding the oily 4-hydroxy-4(2-pyridyl)-cyclohexanone showing in the I.R.-spectrum bands at 3435 and 1710 cm.$^{-1}$.

3.8 g. thereof are heated for 2 hours in 7 ml. concentrated sulfuric acid at 120–130°, the solution poured onto ice, made basic with sodium hydroxide and extracted with methylene chloride. The dried extract leaves after evaporation the oily 4-(2-pyridyl)-3-cyclohexenone.

3.0 g. thereof, dissolved in 50 ml. 95% ethanol, are hydrogenated in the presence of 0.6 g. palladium-charcoal under normal conditions yielding after filtration and evaporation the desired 4-(2-pyridyl)-cyclohexanone.

EXAMPLE 42

0.44 g. 1β-(4 - bromo-benzene-sulfonyloxy)-3β,5β-diphenyl-4α-(2-pyridyl)-cyclohexane are dissolved in 10 ml. dioxane and 0.71 g. pyrrolidine are added. The reaction mixture is heated on a steam bath under nitrogen for 24 hours and evaporated under reduced pressure. The remaining oil is dissolved in diethyl ether, the solution washed with 5% aqueous sodium hydrogencarbonate, dried and evaporated. Frictional crystallization of the residue from n-hexane yields, besides some unreacted brosylate, the 1α-pyrrolidino-3β,5β-diphenyl-4α-(2-pyridyl)-cyclohexane melting at 107–110°; it is identical with that obtained according to Example 26.

The starting material is prepared as follows:

The mixture of 6.54 g. 3β,5β-diphenyl-4α-(2-pyridyl)-cyclohexanone and 250 ml. absolute ethanol is hydrogenated in the presence of 0.5 g. Adams' catalyst for 7 hours at atmospheric pressure. After filtration and evaporation the residue is stirred for 1 hour in 100 ml. diethyl ether, this solution filtered, the filtrate washed, dried and evaporated. After crystallization of the resulting 1β-hydroxy-3β, 5β-diphenyl-4α-(2-pyridyl)-cyclohexane from benzene it melts at 227–228°. From the evaporated mother liquor there is obtained the corresponding axial epimer melting at 166–167° after chromatography on silica gel and recrystallization from cyclohexane.

The same equatorial compound melting at 227–228° can be prepared from the starting ketone by reduction with sodium borohydride in dioxane.

2.0 g. thereof are dissolved in 30 ml. anhydrous pyridine and 1.65 g. 4-bromo-benzenesulfonyl chloride are added. The mixture is allowed to stand at room temperature under nitrogen for 3 days and then added to 150 g. ice and water with stirring. The precipitate is filtered off, washed with water and dried. It is dissolved in 200 ml. diethyl ether, the solution filtered through charcoal and concentrated to a volume of about 10 ml. It is added to 200 ml. petroleum ether and the crystals formed filtered off and dried. They are representing the 1β-(4-bromo-benzene-sulfonyloxy) - 3β,5β - diphenyl-4α-(2-pyridyl)-cyclohexane melting at 164–164.5°. The corresponding axial epimer has the same melting point but its Rf value and the N.M.R. spectrum is different from that of the equatorial epimer.

EXAMPLE 43

The mixture of 2.0 g. 3β,5β-diphenyl-4α-(2-pyridyl)-cyclopentanone, 0.71 g. pyrrolidine, 1 crystal of p-toluene sulfonic acid and 50 ml. benzene is refluxed under nitrogen and on a water trap for 16 hours. The residue after evaporation in vacuo is dissolved in 100 ml. absolute ethanol and hydrogenated in the presence of 0.2 g. 10% palladium-charcoal. After filtration and evaporation the residue is recrystallized twice from n-hexane to yield the 1ξ-pyrrolidino - 3β,5β - diphenyl-4α-(2-pyridyl)-cyclopentane of the formula

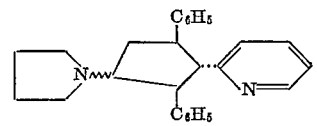

showing in the I.R.-spectrum major bands at 1595, 1375, 750 and 690 cm.$^{-1}$.

The starting material is prepared as follows:

To the solution of 9.8 g. 3β,5β-diphenyl-4α-(2-pyridyl)-cyclohexanone in 50 ml. glacial acetic acid, 9.6 g. bromine is added slowly with stirring and cooling and stirring is continued at room temperature for 1 hour. The mixture is evaporated in vacuo, the unreacted bromine destroyed by addition of dilute sulfurous acid and the whole is poured onto 100 g. ice, neutralized with aqueous ammonia, extracted with methylene chloride and the dried extract evaporated. The remaining 2,6-dibromo-3β,5β-diphenyl-4α(2-pyridyl)-cyclohexanone is recrystallized from methanol.

10.0 g. thereof are added to a solution of 4 g. potassium hydroxide in 100 ml. water and the suspension obtained stirred vigorously until all of the solid is dissolved. The solution is filtered, washed with diethyl ether and slowly concentrated on a steam bath. The resulting syrup is transferred to a porcelain disk and heated slowly to 140°, which temperature is maintained for 3 hours. The product is dissolved in 50 ml. water, the solution filtered, washed with diethyl ether, neutralized with 10% sulfuric acid and the emulsion formed extracted with methylene chloride. The extracts are dried, evaporated and the residue recrystallized from methanol to yield the 1-hydroxy-3β,5β-diphenyl - 4α - (2-pyridyl)-cyclopentane-carboxylic acid showing in the I.R. spectrum characteristic bands at 1660 and 3500 cm.$^{-1}$.

3.0 g. thereof are dissolved in 100 ml. 10% sulfuric acid and the solution warmed to 65°. 4.78 g. lead dioxide are slowly added to the warm, stirred solution and the mixture is stirred on a steam bath until the evolution of carbon dioxide ceases. It is cooled, neutralized with aqueous ammonia, extracted with methylene chloride, the extract dried and evaporated. The remaining 3β,5β-diphenyl-4α-(2-pyridyl)-cyclopentanone is recrystallized from benzene and shows in the I.R. spectrum a characteristic band at 1745 cm.$^{-1}$.

EXAMPLE 44

The compounds described hereinbefore may be used as the active ingredient of the following pharmaceutical compositions containing preferably about 25 to 500 mg. per dosage unit. It may be applied once or twice a day.

20,000 tablets each containing 200 mg. of the active ingredient.

Formula

| | G. |
|---|---|
| 1 - pyrrolidino - 3,5-diphenyl-4-(2-pyridyl)-cyclohexane (mixture of epimers) | 4,000.0 |
| Gelatin | 150.0 |
| Corn starch (anhydrous) | 1,659.0 |
| Talcum | 625.0 |
| Stearic acid | 66.0 |
| Purified water, q.s. | |

Procedure

The cyclohexane and 726 g. of the starch are passed through a 16 mesh screen and mixed thoroughly. The gelatin is dissolved in 2000 ml. water, the solution combined with a suspension of 308 g. starch in 400 ml. cold water and the whole heated on a water bath until a paste is formed. It is combined with the sieved powders using additional water, if necessary. The granulate is passed through a 5 mesh screen, dried at 49° and broken on a 9 mesh screen in the Fitzpatrick mill, knives forward. The granules are mixed with the talcum, stearic acid and the remaining starch and the mixture compressed into tablets using standard concave punches scored and monogrammed.

160,000 tablets each containing 60 mg. of the active ingredient.

Formula

| | G. |
|---|---|
| 1α - pyrrolidino - 3β,5β - diphenyl - 4α - (2-pyridyl)-cyclohexane | 9,600.0 |
| Lactose | 22,689.0 |
| Corn starch | 3,410.0 |
| Confectioners sugar | 2,800.0 |
| Colloidal silica | 1,000.0 |
| Stearic acid | 400.0 |
| Calcium stearate | 100.0 |
| Color FD & C yellow No. 5 | 1.0 |
| Purified water, q.s. | |

Procedure

The cyclohexane, lactose, 2,500 g. of the corn starch, the sugar and colloidal silica are passed through a 16 mesh screen and mixed for 20 minutes. The remaining corn starch is suspended in a cold solution of the color in 1000 ml. water and the suspension added to 4000 ml. boiling water. The mixed powders are granulated with the paste obtained using additional water as required. The granulate is passed through a 5 mesh screen, placed on trays and dried at 38° until the moisture content is between 2 and 3%. The granules are broken on a mill, passed through a 16 mesh screen and treated with the stearic acid and calcium stearate both screened through a 20 mesh screen. After mixing for 20 minutes, the granulate is compressed into tablets using 11/32 inch dies, standard concave punches, uppers bisected, lowers monogrammed. (The sieve sizes used are mesh per inch.)

In these preparations the active ingredient may be replaced by the equivalent amount of other compounds previously described, such as 1α-pyrrolidino-3β,5β-di-(4-methoxy-phenyl)-4-(2-pyridyl)-cyclohexane dimaleate.

EXAMPLE 45

The mixture of 3.95 g. 4-cyano-3,5-diphenyl-4-(2-pyridyl)-cyclohexanone, 17 ml. pyrrolidine, 62 ml. benzene and a trace of p-toluenesulfonic acid is refluxed in a nitrogen atmosphere on a water trap for 6 hours. It is then evaporated, the crystalline residue suspended in 250 ml. absolute ethanol and hydrogenated in the presence of 0.5 g. 10% palladium-charcoal. The catalyst is removed by filtration and the filtrate evaporated to a crystalline solid, which is recrystallized from chloroform-n-hexane to yield the 1ξ - pyrrolidino - 4 - cyano - 3,5 - diphenyl - 4-(2-pyridyl)-cyclohexane of the formula

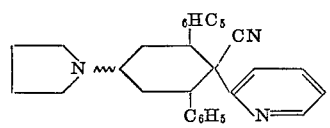

melting at 215–216°.

In the analogous manner the 1ξ-pyrrolidino-4-cyano-3,4,5-triphenyl-cyclohexane melting at 182° can be prepared by selecting the equivalent amount of the corresponding starting material.

The former starting material is prepared as follows: 9.5 g. dibenzalacetone and 4.8 g. 2-pyridylacetonitrile are added to a stirred sodium methoxide solution prepared from 0.15 g. sodium and 50 ml. anhydrous methanol. An exothermic reaction takes place whereby white crystals are formed. They are filtered off, washed twice with methanol and dried, to yield the 4-cyano-3,5-diphenyl-4-(2-pyridyl)-cyclohexanone melting at 176–178°.

EXAMPLE 46

The mixture of 600 mg. 3β,5β-diphenyl-4α-(2-pyridyl)-cyclooctanone, 300 mg. pyrrolidine, 50 ml. benzene and one crystal of p-toluenesulfonic acid is refluxed in an atmosphere of nitrogen, on a water trap for 10 hours. The reaction mixture is evaporated to a yellow froth which is dissolved in 50 ml. 95% ethanol and hydrogenated in the presence of 100 mg. 10% palladium-charcoal at atmospheric pressure for 10 hours. The catalyst is removed and the filtrate evaporated to a yellow gum which crystallizes in n-hexane. Recrystallization from n-hexane yields 1ξ-pyrrolidino-3β,5β-diphenyl-4α-(2-pyridyl)-cyclooctane of the formula

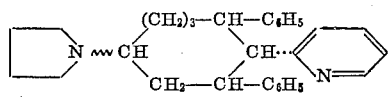

showing in the I.R.-spectrum bands at 1595, 1375, 750 and 690 cm.$^{-1}$.

The starting material is prepared as follows:

The mixture of 2.45 g. 3β,5β-diphenyl 4α-(2-pyridyl)-cyclohexanone, 1.07 g. pyrrolidine, 100 ml. benzene and a trace of p-toluene-sulfonic acid is refluxed in an atmosphere of nitrogen on a water trap for 6 hours. The enamine solution is evaporated to a froth which is dissolved in 20 ml. purified dioxane. To this a solution of 0.735 g. ethyl propriolate in 20 ml. dioxane is added while stirring and the reaction mixture is refluxed under nitrogen for 2 hours. It is cooled and evaporated to an amber froth, which shows an U.V.-absorption at 290 mμ with a shoulder at 272 and 262 mμ and minima at 275 and 247 mμ. The I.R.-spectrum shows a carbonyl absorption at 1715 cm.$^{-1}$ and an olefin absorption at 1670 cm.$^{-1}$; it represents the 1-pyrrolidino-3β,5β-diphenyl-4α-(2-pyridyl)-8-carbethoxy-6,8-cyclooctadiene.

3.41 g. thereof are dissolved in a mixture of 5 ml. acetic acid, 25 ml. water and 50 ml. dioxane and the solution is stirred in a nitrogen atmosphere for 16 hours. It is then evaporated to a yellow gum which is dissolved in diethyl ether. The solution is washed with 5% sodium bicarbonate solution, water and brine, dried and evaporated to a yellow gum which shows an U.V.-absorption at 330 and 262 mµ with shoulders at 282 and 269 mµ and minima at 313 and 245 mµ (a methanol solution thereof gives a red color with 5% ferric chloride solution) and represents the 3β,5β-diphenyl-4α-(2-pyridyl)-8-carbethoxy-cyclooct-7-enone.

3.3 g. thereof are dissolved in 50 ml. 95% ethanol and the solution is hydrogenated in the presence of 100 mg. 10% palladium-charcoal at atmospheric pressure for 6 hours. The catalyst is removed and the filtrate evaporated to a light yellow oil which is dissolved in benzene and chromatographed on a column of neutral alumina (activity II–III). Elution with 10% methanol in methylene chloride yields the 3β,5β-diphenyl-4α-(2-pyridyl)-8-carbethoxy-cyclooctanone melting at 95–100°.

1.1 g. thereof are dissolved in 75 ml. 5% sulfuric acid containing a few ml. ethanol and the solution is heated on a steam bath for 3 hours and is then allowed to stand at 25° for two days. It is filtered through charcoal, the filtrate made alkaline with aqueous ammonia, extracted with methylene chloride, the extract dried, filtered through charcoal and evaporated to a tan froth. It shows in the I.R.-spectrum a band at 1695 cm.$^{-1}$ and represents the 3β,5β-diphenyl-4α-(2-pyridyl)-cyclooctanone melting after recrystallization from cyclohexane at 187–190°.

EXAMPLE 47

The mixture of 5.0 g. 3,4-diphenyl-5-(4-pyridyl)-cyclohexen-2-one, 3.3 ml. pyrrolidino, 150 ml. benzene and 50 mg. p-toluene-sulfonic acid monohydrate is refluxed for 24 hours on a water trap, whereby 0.18 ml. water is collected. Hereupon 2.5 g. platinum dioxide are added to the mixture which is then hydrogenated at atmospheric pressure for 2½ hours during which time 1042 ml. hydrogen are absorbed. The mixture is filtered, the filtrate washed with aqueous ammonia, the organic solution dried, filtered and evaporated in vacuo. The residue is chromatographed of alumina and eluted with benzene-chloroform-ethyl-acetate (50:75:50) to yield the 1ξ-pyrrolidino-3,4-diphenyl-5-(4-pyridyl)-cyclohexane of the formula

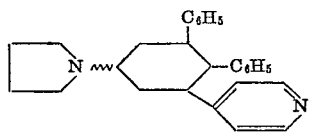

showing in the I.R.-spectrum bands at 1135, 1380, 1415, 1460, 1495 and 1600 cm.$^{-1}$.

The starting material is obtained as follows: 1.0 g. sodium is reacted with 80 ml. ethanol and to the solution, kept under nitrogen, 9.0 g. desoxybenzoin are added while heating the mixture on a warm water bath until dissolution is finished. Hereupon 6.74 g. (4-pyridyl)-methylidene-acetone (B.P. 97–99°/0.05 mm.) in 25 ml. ethanol are quickly added. After standing at room temperature overnight, the reddish solution is diluted with 400 ml. water and extracted with 10% hydrochloric acid, the extract made basic with 10% aqueous sodium hydroxide, extracted with diethyl ether and the extract evaporated under reduced pressure. The residue is dissolved in 30 ml. diethyl ether and upon standing in the cold, crystals separate, which are recrystallized 3 times from aqueous ethanol to yield the 3,4-diphenyl-5-(4-pyridyl)-cyclohexen-2-one melting at 180–183°.

EXAMPLE 48

The mixture of 5.0 g. 3β-(2-pyridyl)-4α,5-diphenyl-cyclohexene-5-one, 3.3 ml. pyrrolidine, 150 ml. benzene and 50 ml. p-toluene sulfonic acid is refluxed for 24 hours on a water trap. Hereupon the mixture is washed with aqueous sodium bicarbonate, dried and evaporated in vacuo. The residue is dissolved in 25 ml. diethyl ether, to the solution 25 ml. petroleum ether are added and upon standing yellow crystals separate representing the 1-pyrrolidino-3β-(2-pyridyl)-4α,5-diphenyl-cyclohexa-1,5-diene melting at 140–144°.

2.5 g. thereof are dissolved in 50 ml. benzene and are hydrogenated in the presence of 2.5 g. platinum oxide under normal conditions until the theoretical amount of hydrogen is absorbed. The solution is filtered, the filtrate concentrated in vacuo to yield the 1-ξ-pyrrolidino-3β-(2-pyridyl)-4α,5-diphenyl-cyclohexane of the formula

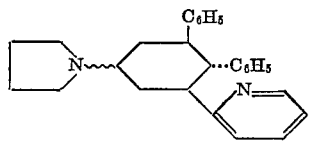

showing in the I.R.-spectrum bands at 700, 750, 1440, 1480, 1500, 1580 and 1600 cm.$^{-1}$.

The starting material is prepared as follows: The mixture of 9.85 ml. 2-pyridyl aldehyde and 13.6 ml. ethyl acetoacetate is chilled to 0° and 9 drops of diethylamine are added. The mixture is allowed to stand for 6 days at 5° during which time it becomes a dark green and viscous mixture. The crystalline cake formed is filtered off and the crystals triturated twice with 25 ml. of water. Hereupon they are dissolved in methylene chloride, the solution is passed through a column of silica gel and the eluate is evaporated. The residue is taken up in 50 ml. methylene chloride and 50 ml. cyclohexane and the solution is concentrated to about 30 ml. to yield the ethyl α-(2-pyridyl)-methylidene-acetoacetate melting at 118–122°.

10.0 g. thereof are dissolved in a mixture of 20 ml. concentrated hydrochloric acid and 80 ml. water and the solution is refluxed for 24 hours. After cooling it is made basic with aqueus sodium hydroxide, the mixture is saturated with sodium chloride and extracted with methylene chloride. The extract is dried, evaporated in vacuo, the residue distilled and the fraction boiling at 87–89°/0.06 mm. collected; it represents the (2-pyridyl)-methylidene-acetone.

6.74 g. thereof in 25 ml. ethanol are quickly added to the solution of 1.054 g. sodium and 80 ml. ethanol containing 9.0 g. desoxybenzoin, kept on a steam bath. After being stirred at room temperature for 18 hours, the red solution is diluted with 400 ml. water and extracted with 10% hydrochloric acid. The extract is made basic with 10% aqueous sodium hydroxide, extracted with diethyl ether and the extract evaporated under reduced pressure. The residue is dissolved in diethyl ether and upon standing in the cold crystals separate which are recrystallized from aqueous ethanol to yield the 3β-(2-pyridyl)-4α,5-diphenyl-cyclohexene-5-one melting at 165–172°.

EXAMPLE 49

The mixture of 3.37 g. 3β-phenyl-4α,5-di(2-pyridyl)-cyclohexene-5-one, 3.5 ml. pyrrolidine, 100 ml. dry benzene and 1 mg. p-toluene sulfonic acid is refluxed for 16 hours on a water trap. Hereupon 1.0 g. 10% palladium-charcoal is added and the mixture is hydrogenated at room temperature and atmospheric presssure until the theoretical amount of hydrogen is absorbed. The mixture is filtered, the filtrate washed with aqueous ammonia, the organic layer dried, filtered and evaporated under reduced pressure. The residue is dissolved in methylene chloride and chromatographed on alumina (neutral, activity I) and the eluate evaporated in vacuo to yield the 1ξ-pyrrolidino-3β-phenyl-4α,5β-di-(2-pyridyl)-cyclohexane of the formula

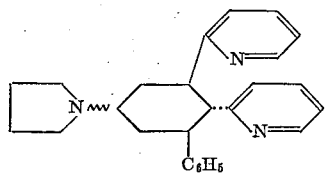

showing in the IR-spectrum bands at 700, 745, 1156, 1380, 1465 and 1600 cm.⁻¹.

The starting material is prepared analogous to the method shown in Example 48.

EXAMPLE 50

The solution of 3.96 g. citric acid monohydrate in 30 ml. 95% ethanol is added to the solution of 7.20 g. 1α-pyrrolidino - 3β,5β - diphenyl-4α-(2-pyridyl)-cyclohexane in 30 ml. of the same solvent. The mixture is warmed on the steam bath to dissolve base which initially precipitates; it is then cooled and seeded with crystalline citrate. After about two hours some crystals separate, but stirring and scratching are necessary to obtain a reasonable quantity. After chilling, a first crop M.P. 185–186°, is obtained. Two further crops with lower melting points are obtained by successive concentration of the mother liquors. The combined material is recrystallized by dissolution in 65 ml. 95% ethanol, filtration through charcoal and concentration to 35 ml. It is again necessary to scratch, and the mixture is left in the freezer two days to yield the 1α - pyrrolidino-3β,5β-diphenyl-4α-(2-pyridyl)-cyclohexane citrate of the formula

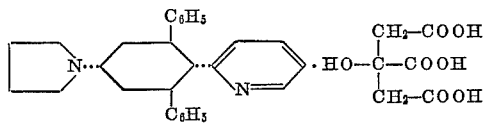

melting at 187.5–189.5°.

EXAMPLE 51

The solution of 2.70 g. 3β,5β-diphenyl-4β-(2-pyridyl)-cyclohexanone, 1.78 g. pyrrolidine and a trace of p-toluenesulfonic acid in 75 ml. benzene is refluxed in a nitrogen atmosphere for 2 hours under a water trap, then for an additional hour under a Soxhlet apparatus containing potassium hydroxide pellets. After evaporation of the solvent the residue is dissolved in 75 ml. anhydrous ethanol, 0.25 g. of 10% palladium charcoal are added and hydrogenation is carried out at atmospheric pressure. After separation of the catalyst and evaporation of the solvent the residual syrup is taken up in 15 ml. low-boiling petroleum ether. On standing, after a small quantity of amorphous solid has been separated, the yellow solution deposits the 1β - pyrrolidino - 3β,5β - diphenyl-4β-(2-pyridyl)-cyclohexane of the formula

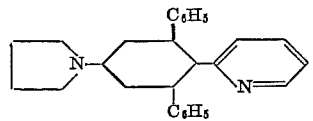

melting after recrystallization from n-hexane at 145.5–146.5°.

The petroleum-ether mother liquors are evaporated to dryness, the residue is dissolved in a small volume of methanol and the solution filtered through charcoal and chilled. The precipitate formed is recrystallized from methanol to yield the corresponding 1α-epimer of the formula

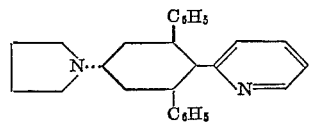

melting at 133.5–134.5°.

The starting material is prepared as follows:

35 g. of the 3,5-diphenyl-4-(2-pyridyl)-cyclohexanone melting at 240° and obtained according to Example 1, are dissolved in 500 ml. benzene and chromatographed on 500 g. alumina (neutral, activity II–III). The first benzene eluate yields pure 3β,5β-diphenyl-4β(2-pyridyl)-cyclohexanone, which melts after recrystallization from cyclohexane at 157–158°. The following eluate is a mixture (A) of said compound together with its 4α- and 5α- epimers. Further elution with benzene yields relatively pure 3β,5β-diphenyl-4β-(2-pyridyl)-1β-cyclohexanol melting after recrystallization from benzene-cyclohexane (1:3) and cyclohexane-methylene chloride at 162.5–163.5°. The last substance eluted is the 4α-epimer of the latter melting after recrystallization from benzene at 213–217°.

The mixture (A) is recrystallized from cyclohexane-benzene (5:1) to yield the 3β,5β-diphenyl-4α-(2-pyridyl)-cyclohexanone melting after recrystallization from methylene chloride-ethylacetate at 240–242°. The mother liquors are evaporated and the residue crystallized from diethyl ether to yield the 3β,5α-diphenyl-4β-(2-pyridyl)-cyclohexanone melting at 139.5–140.5° after recrystallizations from methanol and cyclohexane.

EXAMPLE 52

The reaction of 1.96 g. 3β,5α-diphenyl-4β-(2-pyridyl)-cyclohexanone, 1.28 g. pyrrolidine and a trace of p-toluenesulfonic acid in 50 ml. benzene is performed as described in Example 51. The enamine obtained is then hydrogenated requiring, however, 18 hours for completion. After separation of the catalyst and removal of the solvent, the residue is taken up as completely as possible in hot cyclohexane, the solution filtered through charcoal and evaporated. The residual gum, which appears to be homogeneous by thin-layer chromatography, is finally brought to crystallization by dissolution in a few milliliters of acetone and chilling and scratching. The resulting product is recrystallized from n-hexane to yield the 1ξ-pyrrolidino-3β,5α-diphenyl-4β-(2-pyridyl) - cyclohexane of the formula

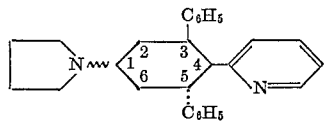

melting at 123.5–124.5°.

EXAMPLE 53

The mixture of 36.14 g. 3β,5β-diphenyl-4α-(2-pyridyl)-cyclohexanone, 23.54 g. pyrrolidine and 350 ml. toluene is refluxed for 4 hours on a water trap and hereupon it is evaporated under reduced pressure and at 60–70°. The residue is suspended in 500 ml. anhydrous ethanol and hydrogenated at room temperature over 4.2 g. 5% palladium-charcoal. After about 2½ hours the theoretical amount of hydrogen has been absorbed, the mixture is filtered and the filtrate evaporated in vacuo. The residue is dissolved in 500 ml. hot n-hexane and the solution kept for 2 days at 5° and finally at −5°. The crystals formed are filtered off, washed twice with 50 ml. n-hexane each and dried at 80°/40 mm. Hg to yield the 1α-pyrrolidino-3β,5β-diphenyl-4α-(2-pyridyl)-cyclohexane.

To the solution of 19.10 g. thereof in 70 ml. ethanol the solution of 10.50 g. citric acid in 40 ml. ethanol is added and the last traces of citric acid are washed out with 15 ml. ethanol to yield a clear solution at 29°. It is then seeded with the crystals of the product obtained according to Example 50 and stirred overnight at room temperature during which time crystallization occurs. After chilling for 4 hours to −10°, the mixture is filtered and the residue washed twice with 12.5 ml. cold ethanol to yield after drying at 80°/40 mm. Hg the 1α-pyrrolidino-3β,5β-diphenyl-4α-(2-pyridyl)-cyclohexane citrate which is identical with the product obtained according to example 50.

The starting material is prepared as follows:

To the solution of 22.80 g. sodium methoxide in 200 ml. methanol, kept under nitrogen, the solution of 78.88 g. 2-phenacylpyridine in 60 ml. methanol is added during about 5 minutes, maintaining the temperature at 20±2°. After rinsing with 90 ml. methanol and stirring for 15 minutes, the solution of 58.48 g. benzylacetone in 60 ml. methanol is added during 20 minutes, maintaining the temperature at 23±5°. After rinsing with 40 ml. methanol the yellow slurry obtained is stirred for 3 hours at 25°, cooled for 2 hours at 3–6° and filtered. The residue is washed twice with 50 ml. cold methanol each and 3 times with 50 ml. water each, to yield the 3α-hydroxy-3β,5β-diphenyl-4α-(2-pyridyl)-cyclohexanone melting at 239.5 to 242.5° after recrystallization from ethylene dichloride.

The slurry of 50.0 g. thereof in 150 ml. 85% phosphoric acid is stirred for 24 hours at 20±2° during which time solution occurs. The viscous solution is slowly poured onto a mixture of 300 g. ice, 100 ml. concentrated aqueous ammonia and 150 ml. methylene chloride during about one hour. Hereupon 200 ml. ammonia are added with cooling to raise the pH to 6.0 to 6.4. The organic layer is separated and the aqueous solution extracted 4 times with 50 ml. methylene chloride each. The combined organic solutions are washed with 100 ml. water, dried and concentrated on the steam bath to 250 ml. At this point 250 ml. cyclohexane are added and distillation is continued until the volume reaches 250 ml. Another 250 ml. cyclohexane are added, the suspension obtained cooled overnight at 5°, hereupon filtered and the residue washed with 50 ml. cold cyclohexane to yield the 3,5β-diphenyl-4α-(2-pyridyl)-2-cyclohexenone melting after drying at 60°/40 mm. Hg at 140–142°.

The solution of 39.0 g. thereof in 1 liter ethylacetate is added to 10.8 g. 5% palladium charcoal, kept under nitrogen, the suspension is slowly hydrogenated under normal conditions for 3 days and then filtered. The catalyst is washed with 200 ml. warm ethylacetate, the filtrate is heated to 70° and clarified through a pad of filter paper. The clear solution obtained is concentrated under reduced pressure and at 60–65° to a volume of about 350 ml. It is then cooled, 270 ml. ethylene chloride are added and concentration is resumed at the same temperature to about 150 ml. Ethylacetate is added to yield a volume of 250 ml., the mixture is refluxed for 15 minutes, then cooled slowly to room temperature and placed overnight in the refrigerator at 5°. The following day the crystals formed are filtered off and washed with 25 ml. cold ethylacetate to yield the 3β,5β-diphenyl-4α-(2-pyridyl)-cyclohexanone melting at 241–245.5°.

EXAMPLE 54

1000 tablets each containing 25 mg. of the active ingredient:

Formula

| | G. |
|---|---|
| 1α pyrrolidino - 3β,5β - diphenyl - 4α - (2-pyridyl)-cyclohexane citrate | 25.0 |
| Colloidal silica | 2.5 |
| Corn starch | 7.5 |
| Magnesium stearate | 1.0 |
| Lactose | 114.0 |
| Ethanol (anhydrous) | Q.s. |
| Purified water | Q.s. |

Procedure

The lactose and the citrate is passed through a comminuting machine using a screen with 1.2 mm. opening. The stearate, starch and silica, previously mixed with a small portion of the lactose, are added to the sieved powders, which are mixed at low speed for 30 minutes. They are then granulated with ethanol-water (1:1) until suitable granules are formed. The granulate is passed through a comminuting machine (knives forward) using a screen with 4.0 mm. opening. The granulate is dried at 49° to a moisture content below 2%, again passed through a comminuting machine (knives forward) using a screen with 1.4 mm. opening and compressed into 150 mg. tablets using 9/32″ standard concave punches. The disintegration time of said tablets is less than 30 minutes.

EXAMPLE 55

1000 tablets each containing 75 mg. of two active ingredients:

Formula

| | G. |
|---|---|
| 1α - pyrrolidino - 3β,5β - diphenyl - 4α - (2 - pyridyl)-cyclohexane citrate | 25.0 |
| 6 - chloro - 7 - sulfamyl - 2H - 3,4 - dihydro - 1,2,4-benzothiadiazine - 1,1 - dioxide | 50.0 |
| Corn starch | 10.0 |
| Lactose | 74.0 |
| Magnesium stearate | 1.0 |
| Polyethylene glycol 6000 | 10.0 |
| Sucrose syrup | 20.0 |
| Talc | 10.0 |

Procedure

The starch, lactose, stearate and talc are passed through a screen with 1.2 mm. opening and mixed well. The citrate and benzothiadiazine, previously mixed with a portion of lactose and passed through the same screen, are added and the whole is blended for 20 minutes in a low speed mixer. The syrup and molten glycol are mixed at 70° and the mixture added to the powders to allow granulate for 30 minutes. The granulate is passed through a comminuting machine using a screen with 4.0 mm. opening and dried at room temperature overnight with circulating air. The dry granulate is passed through a comminuting machine using a screen with 1.4 mm. opening and compressed into 200 mg. tablets using 10/32″ dies and flat beveled punches. The disintegration time of said tablets is about 30 minutes.

What is claimed is:

1. A compound selected from the group having the general formula

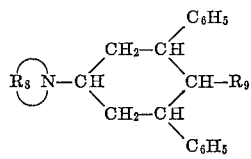

in which $R_8$ stands for a member selected from the group consisting of 1,4-butylene, 1,5-pentylene, 3-oxa-pentylene-(1,5), 3-thiapentylene-(1,5), 3-methyl-3-aza-pentylene-(1,5) and 3-ethyl-3-aza-pentylene-(1,5) and $R_9$ stands for a member selected from the group consisting of 2-pyridyl, 3-pyridyl and 4-pyridyl, or a therapeutically acceptable acid addition salt thereof.

2. A compound as claimed in claim 1 and having the formula

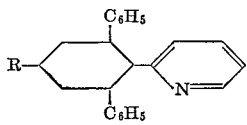

in which R stands for a member selected from the group consisting of pyrrolidino, piperidino, morpholino, thiamorpholino, 4-methylpiperazino, dimethylamino, 2-dimethylamino-ethylamino, amino, n-propylamino and Δ³-pyrrolino, or a therapeutically acceptable acid addition salt thereof.

3. A compound as claimed in claim 1 and having the formula

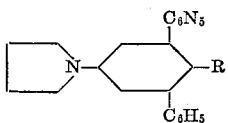

in which R stands for a member selected from the group consisting of phenyl, 3-pyridyl, 4-pyridyl, 4-pyrimidyl and 2-quinolyl, or a therapeutically acceptable acid addition salt thereof.

4. A compound as claimed in claim 1 and having the formula

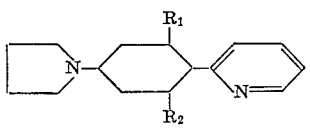

in which $R_1$ stands for a member selected from the group consisting of hydrogen, 2-furyl- 4-methoxy-phenyl, 4-hydroxy-phenyl, 4-chloro-phenyl, 3,4,5-trimethoxy-phenyl and 2-pyridyl and $R_2$ for a member selected from the group consisting of hydrogen, 2-furyl, 4-methoxy-phenyl, 4 - hydroxy - phenyl, 4 - chloro-phenyl,3,4,5 - trimethoxy-phenyl and phenyl, or a therapeutically acceptable acid addition salt thereof.

5. A compound as claimed in claim 1 and having the formula

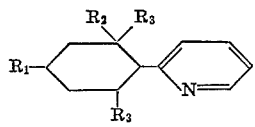

in which $R_1$ is pyrrolidino, $R_2$ for a member selected from the group consisting of hydroxy and propionyloxy and $R_3$ for a member selected from the group consisting of phenyl, cyclohexyl and 4-methoxy-phenyl, or a therapeutically accepable acid addition salt thereof.

6. A compound as claimed in claim 1 and having the formula

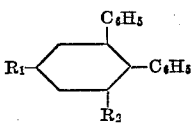

in which $R_1$ is pyrrolidino and $R_2$ for a member selected from the group consisting of phenyl, 4-pyridyl and 2-pyridyl, or a therapeutically acceptable acid addition salt thereof.

7. A compound as claimed in claim 1 and being a member selected from the group consisting of $1\alpha$-pyrrolidino-$3\beta,5\beta$-diphenyl - $4\alpha$-(2-pyridyl)-cyclohexane and a therapeutically acceptable acid addition salt thereof.

8. A compound as claimed in claim 1 and being the $1\alpha$-pyrrolidino - $3\beta,5\beta$ - diphenyl - $4\alpha$-(2-pyridyl)-cyclohexane citrate.

9. A compound as claimed in claim 1 and being a $1\alpha$-pyrrolidino - $3\beta,5\beta$ - diphenyl-$4\alpha$-(2-N-lower alkyl pyridinium)cyclohexane halide.

10. A compound as claimed in claim 1 and being a member selected from the group consisting of the methoiodide and methochloride of $1\alpha$-pyrrolidino-$3\beta,5\beta$-diphenyl-$4\alpha$-(2-pyridinium)-cyclohexane.

11. A compound as claimed in claim 1 and being the $1\alpha$-pyrrolidino - $3\beta,5\beta$ - diphenyl - $4\alpha$-(2-pyridyl)-cyclohexane bis-N-oxide.

12. A compound as claimed in claim 1 and being a member selected from the group consisting of the $1\xi$-pyrrolidino-$3\beta,5\beta$ - diphenyl - $4\alpha$-(2-pyridyl)-cyclopentane, $1\xi$-pyrrolidino-$3\beta,5\beta$-diphenyl - $4\alpha$-(2-pyridyl)-cyclooctane and a therapeutically acceptable acid addition salt thereof.

13. A compound as claimed in claim 1 and being a member selected from the group consisting of the $1\beta$-pyrrolidino-$3\beta,5\beta$ - diphenyl - $4\alpha$-(2-pyridyl-cyclohexane, the $1\beta$-pyrrolidino-$3\beta,5\beta$-diphenyl - $4\beta$-(2-pyridyl)-cyclohexane, the $1\alpha$-pyrrolidino-$3\beta,5\beta$-diphenyl-$4\beta$-(2-pyridyl)-cyclohexane, the $1\xi$-pyrrolidino - $3\beta,5\alpha$-diphenyl-$4\beta$-(2-pyridyl)-cyclohexane and a therapeutically acceptable acid addition salt thereof.

No references cited.

JOHN D. RANDOLPH, Primary Examiner

ALAN L. ROTMAN, Assistant Examiner

U.S. Cl. X.R.

260—243, 247.1, 247.2, 247.5, 250, 256.4, 268, 286, 288, 293, 296, 326.8, 348, 570.5, 586; 424—250, 258, 263, 266, 267, 274, 275